US012351108B2

(12) United States Patent
Peterson

(10) Patent No.: US 12,351,108 B2
(45) Date of Patent: Jul. 8, 2025

(54) VEHICULAR EXTERIOR REARVIEW MIRROR ASSEMBLY WITH EXTENDABLE AND RETRACTABLE MIRROR HEAD

(71) Applicant: Magna Mirrors of America, Inc., Holland, MI (US)

(72) Inventor: Kenneth C. Peterson, Ada, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 551 days.

(21) Appl. No.: 17/811,321

(22) Filed: Jul. 8, 2022

(65) Prior Publication Data

US 2023/0012333 A1 Jan. 12, 2023

Related U.S. Application Data

(60) Provisional application No. 63/203,122, filed on Jul. 9, 2021.

(51) Int. Cl.
*B60R 1/07* (2006.01)
*B60R 1/074* (2006.01)

(52) U.S. Cl.
CPC .............. *B60R 1/07* (2013.01); *B60R 1/074* (2013.01)

(58) Field of Classification Search
CPC .................................. B60R 1/07; B60R 1/074
USPC .................................................. 359/841, 877
See application file for complete search history.

(56) References Cited

U.S. PATENT DOCUMENTS

| 2,839,965 | A | | 6/1958 | Budreck |
| 4,278,227 | A | | 7/1981 | Davis et al. |
| 4,422,724 | A | | 12/1983 | Otsuka et al. |
| 4,502,759 | A | | 3/1985 | Herzog et al. |
| 4,558,930 | A | * | 12/1985 | Deedreek ............. G02B 7/1827 359/881 |
| 5,033,835 | A | | 7/1991 | Platzer, Jr. |
| 5,050,977 | A | | 9/1991 | Platzer, Jr. |
| 5,080,492 | A | | 1/1992 | Platzer, Jr. |
| 5,182,676 | A | | 1/1993 | Iwai et al. |
| 5,371,659 | A | | 12/1994 | Pastrick et al. |
| 5,383,057 | A | | 1/1995 | Kimura et al. |
| 5,467,230 | A | | 11/1995 | Boddy et al. |
| 5,477,390 | A | | 12/1995 | Boddy et al. |
| 5,483,385 | A | | 1/1996 | Boddy |
| 5,489,080 | A | | 2/1996 | Allen |
| 5,497,306 | A | | 3/1996 | Pastrick |

(Continued)

*Primary Examiner* — Ricky D Shafer
(74) *Attorney, Agent, or Firm* — HONIGMAN LLP

(57) ABSTRACT

A vehicular exterior rearview mirror assembly includes a mirror head and a mounting arm. The mirror head is mounted at the mounting arm via an adjustment mechanism. With the mounting arm attached at a side of a vehicle, an adjustment mechanism is operable to adjust the mirror head relative to the mounting arm between a retracted position and an extended position. The adjustment mechanism includes an actuator that is electrically operable to pivotally adjust a link that includes a first end pivotally attached to the mirror head and a second end pivotally attached at the mounting arm. The adjustment mechanism, when the actuator is operated, moves the mirror head along a path between the retracted and extended positions. The actuator is disposed at the mirror head so that, when the mirror head moves between the retracted and extended positions, the actuator travels along the path with the mirror head.

26 Claims, 14 Drawing Sheets

(56) References Cited

U.S. PATENT DOCUMENTS

| | | |
|---|---|---|
| 5,546,239 A | 8/1996 | Lewis |
| 5,552,094 A | 9/1996 | Kubota |
| 5,555,136 A | 9/1996 | Waldmann et al. |
| 5,572,376 A | 11/1996 | Pace |
| 5,582,383 A | 12/1996 | Mertens et al. |
| 5,600,497 A | 2/1997 | Leonberger |
| 5,669,699 A | 9/1997 | Pastrick et al. |
| 5,680,263 A | 10/1997 | Zimmermann et al. |
| 5,684,646 A | 11/1997 | Boddy |
| 5,701,211 A | 12/1997 | Perry et al. |
| 5,703,731 A | 12/1997 | Boddy et al. |
| 5,790,298 A | 8/1998 | Tonar |
| 5,793,543 A | 8/1998 | Kimura et al. |
| 5,823,654 A | 10/1998 | Pastrick et al. |
| 5,949,591 A | 9/1999 | Whitehead |
| 5,980,047 A | 11/1999 | Kogita et al. |
| 6,106,122 A | 8/2000 | Gilbert et al. |
| 6,116,743 A | 9/2000 | Hoek |
| 6,170,956 B1 | 1/2001 | Rumsey et al. |
| 6,176,602 B1 | 1/2001 | Pastrick et al. |
| 6,178,034 B1 | 1/2001 | Allemand et al. |
| 6,213,609 B1 | 4/2001 | Foote et al. |
| 6,213,612 B1 | 4/2001 | Schnell et al. |
| 6,239,899 B1 | 5/2001 | DeVries et al. |
| 6,239,928 B1 | 5/2001 | Whitehead et al. |
| 6,243,218 B1 | 6/2001 | Whitehead |
| 6,249,369 B1 | 6/2001 | Theiste et al. |
| 6,276,808 B1 | 8/2001 | Foote et al. |
| 6,276,821 B1 | 8/2001 | Pastrick et al. |
| 6,312,135 B1 | 11/2001 | Polzer |
| 6,315,419 B1 | 11/2001 | Platzer, Jr. |
| 6,325,518 B1 | 12/2001 | Whitehead et al. |
| 6,394,616 B1 | 5/2002 | Foote et al. |
| 6,407,847 B1 | 6/2002 | Poll et al. |
| 6,439,755 B1 | 8/2002 | Fant, Jr. et al. |
| 6,452,479 B1 | 9/2002 | Sandbach |
| 6,467,920 B2 | 10/2002 | Schnell et al. |
| 6,497,491 B2 | 12/2002 | Boddy et al. |
| 6,499,850 B2 | 12/2002 | Waldmann |
| 6,502,970 B1 | 1/2003 | Anderson et al. |
| 6,522,451 B1 | 2/2003 | Lynam |
| 6,535,126 B2 | 3/2003 | Lin et al. |
| 6,565,221 B2 | 5/2003 | Guttenberger et al. |
| 6,582,109 B2 | 6/2003 | Miller |
| 6,598,980 B2 | 7/2003 | Marusawa et al. |
| 6,606,183 B2 | 8/2003 | Ikai et al. |
| 6,614,579 B2 | 9/2003 | Roberts et al. |
| 6,619,955 B2 | 9/2003 | Cardarelli |
| 6,650,457 B2 | 11/2003 | Busscher et al. |
| 6,690,268 B2 | 2/2004 | Schofield et al. |
| 6,698,905 B1 | 3/2004 | Whitehead |
| 6,717,712 B2 | 4/2004 | Lynam et al. |
| 6,755,543 B1 * | 6/2004 | Foote .................... B60R 1/078 359/872 |
| 6,916,100 B2 | 7/2005 | Pavao |
| 6,954,152 B1 | 10/2005 | Matthews |
| 6,981,774 B2 | 1/2006 | Dumont et al. |
| 7,012,729 B2 | 3/2006 | Tonazzi et al. |
| 7,070,287 B2 | 7/2006 | Foote et al. |
| 7,080,914 B1 | 7/2006 | Boddy |
| 7,093,946 B2 | 8/2006 | Barve et al. |
| 7,093,965 B2 | 8/2006 | Veldman |
| 7,097,312 B2 | 8/2006 | Platzer, Jr. |
| 7,104,663 B2 | 9/2006 | Whitehead |
| 7,110,156 B2 | 9/2006 | Lawlor et al. |
| 7,126,456 B2 | 10/2006 | Boddy et al. |
| 7,159,992 B2 | 1/2007 | Foote |
| 7,195,381 B2 | 3/2007 | Lynam et al. |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,267,449 B1 | 9/2007 | Boddy et al. |
| 7,303,294 B1 * | 12/2007 | Ruse .................... B60R 1/0617 248/479 |
| 7,314,285 B2 | 1/2008 | Ruse et al. |
| 7,354,165 B1 | 4/2008 | Ruse et al. |
| 7,370,983 B2 | 5/2008 | DeWind et al. |
| 7,455,414 B2 | 11/2008 | Duroux et al. |
| 7,510,311 B2 | 3/2009 | Romas et al. |
| 7,532,149 B2 | 5/2009 | Banko et al. |
| 7,626,749 B2 | 12/2009 | Baur et al. |
| 7,690,800 B2 | 4/2010 | Fukai et al. |
| 7,722,199 B2 | 5/2010 | DeWard et al. |
| 7,748,856 B2 | 7/2010 | Zhao |
| 7,817,020 B2 | 10/2010 | Turnbull et al. |
| 7,824,045 B2 | 11/2010 | Zhao |
| 7,883,224 B2 | 2/2011 | Onuki |
| 7,887,204 B2 | 2/2011 | Zhao |
| 7,926,960 B2 | 4/2011 | Skiver et al. |
| 7,934,844 B1 | 5/2011 | Zhao |
| 7,944,371 B2 | 5/2011 | Foote et al. |
| 7,980,711 B2 | 7/2011 | Takayanagi et al. |
| 8,004,741 B2 | 8/2011 | Tonar et al. |
| 8,018,440 B2 | 9/2011 | Townsend et al. |
| 8,021,005 B2 | 9/2011 | Zhao |
| 8,048,085 B2 | 11/2011 | Peterson et al. |
| 8,049,640 B2 | 11/2011 | Uken et al. |
| 8,154,418 B2 | 4/2012 | Peterson et al. |
| 8,169,684 B2 | 5/2012 | Bugno et al. |
| 8,179,586 B2 | 5/2012 | Schofield et al. |
| 8,194,133 B2 | 6/2012 | DeWind et al. |
| 8,237,909 B2 | 8/2012 | Ostreko et al. |
| 8,339,526 B2 | 12/2012 | Minikey, Jr. et al. |
| 8,366,285 B2 | 2/2013 | Reedman et al. |
| 8,465,161 B2 | 6/2013 | DeWind et al. |
| 8,508,831 B2 | 8/2013 | De Wind et al. |
| 8,602,575 B2 | 12/2013 | Negel |
| 8,730,553 B2 | 5/2014 | De Wind et al. |
| 8,736,940 B2 | 5/2014 | Rawlings |
| 8,786,704 B2 | 7/2014 | Foote et al. |
| 8,915,601 B2 | 12/2014 | Foote et al. |
| 8,917,437 B2 | 12/2014 | Baur et al. |
| 9,067,541 B2 | 6/2015 | Sobecki et al. |
| 9,796,334 B2 | 10/2017 | Peterson et al. |
| 10,220,787 B2 | 3/2019 | Peterson et al. |
| 10,875,454 B2 | 12/2020 | Peterson et al. |
| 11,718,232 B2 | 8/2023 | Peterson et al. |
| 2002/0021506 A1 * | 2/2002 | Whitehead .............. B60R 1/078 359/838 |
| 2002/0141085 A1 * | 10/2002 | Whitehead .............. B60R 1/078 359/877 |
| 2003/0117729 A1 * | 6/2003 | Foote .................... B60R 1/072 359/877 |
| 2006/0050018 A1 | 3/2006 | Hutzel et al. |
| 2006/0061008 A1 | 3/2006 | Karner et al. |
| 2006/0273232 A1 | 12/2006 | Lang et al. |
| 2007/0002477 A1 | 1/2007 | Whitehead |
| 2007/0139751 A1 | 6/2007 | Kuiper et al. |
| 2007/0285812 A1 | 12/2007 | Foote et al. |
| 2008/0024891 A1 * | 1/2008 | Ruse .................... B60R 1/078 359/881 |
| 2009/0040306 A1 | 2/2009 | Foote et al. |
| 2009/0243824 A1 | 10/2009 | Peterson et al. |
| 2011/0194203 A1 | 8/2011 | Foote et al. |
| 2011/0317242 A1 | 12/2011 | Tonar et al. |
| 2012/0026571 A1 | 2/2012 | Uken et al. |
| 2012/0038964 A1 | 2/2012 | De Wind et al. |
| 2012/0236388 A1 | 9/2012 | De Wind et al. |
| 2013/0107386 A1 | 5/2013 | Sobecki et al. |
| 2014/0005907 A1 | 1/2014 | Bajpai |
| 2014/0133044 A1 | 5/2014 | Mambourg |
| 2014/0285666 A1 | 9/2014 | O'Connell et al. |
| 2014/0376119 A1 | 12/2014 | Sobecki et al. |
| 2015/0097955 A1 | 4/2015 | De Wind et al. |
| 2015/0224930 A1 | 8/2015 | Foote et al. |
| 2015/0353018 A1 | 12/2015 | Sobecki et al. |
| 2020/0361381 A1 * | 11/2020 | Steffes .................... B60R 1/074 |
| 2021/0107406 A1 | 4/2021 | Peterson et al. |
| 2021/0291741 A1 * | 9/2021 | Wilson .................... B60R 1/078 |
| 2023/0373392 A1 | 11/2023 | Peterson et al. |

* cited by examiner

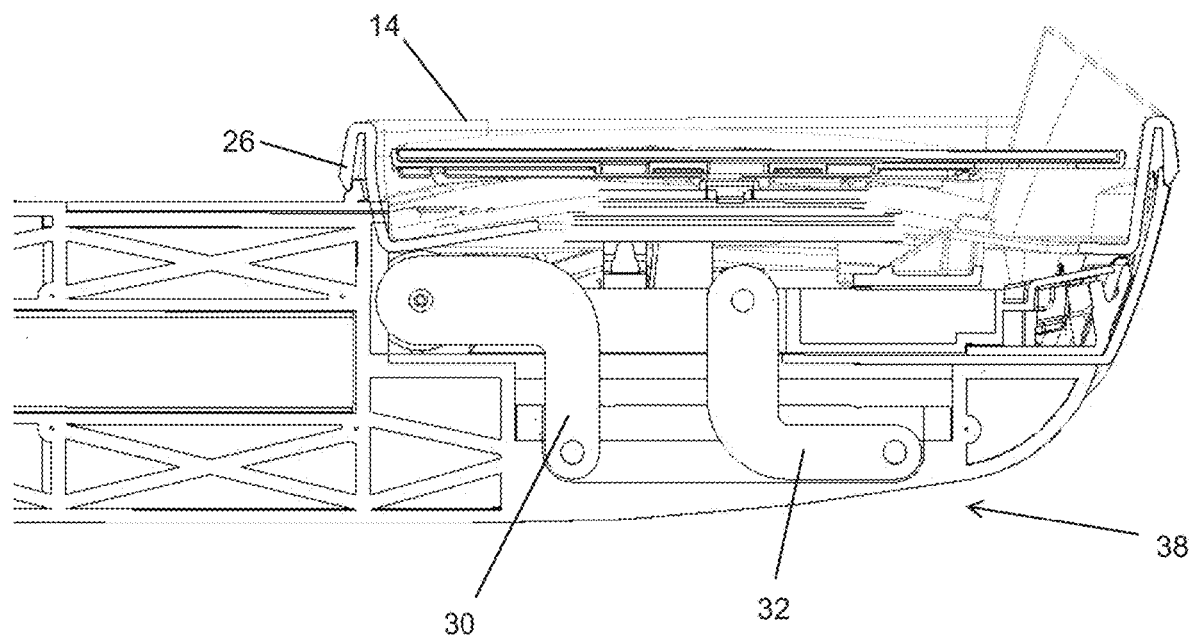
FIG. 23
FIG. 24
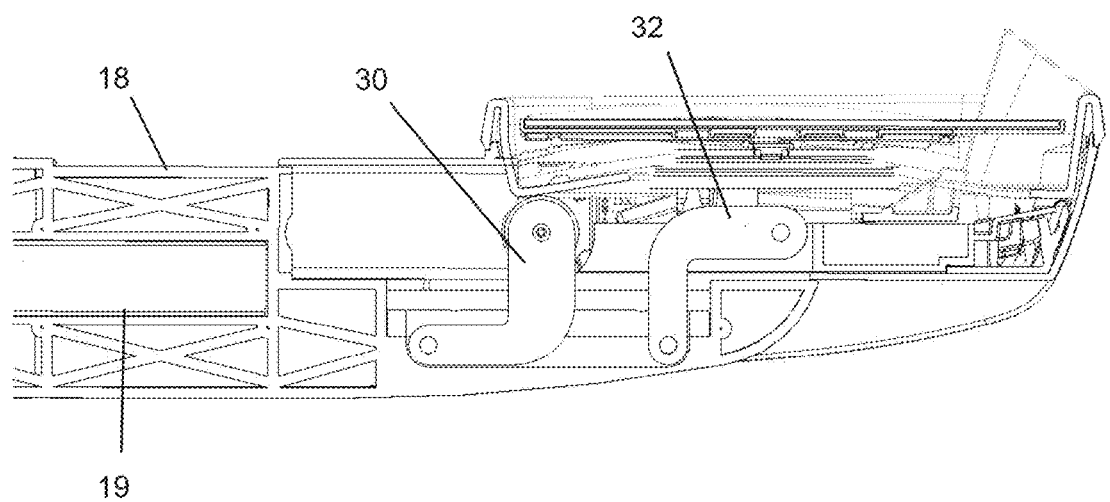

VEHICULAR EXTERIOR REARVIEW MIRROR ASSEMBLY WITH EXTENDABLE AND RETRACTABLE MIRROR HEAD

CROSS REFERENCE TO RELATED APPLICATIONS

The present application claims the filing benefits of U.S. provisional application Ser. No. 63/203,122, filed Jul. 9, 2021, which is hereby incorporated herein by reference in its entirety.

FIELD OF THE INVENTION

The present invention relates generally to the field of exterior rearview mirror assemblies for vehicles and, more particularly, to extendable and retractable exterior rearview mirror assemblies for vehicles.

BACKGROUND OF THE INVENTION

It is known to provide an automotive exterior rearview mirror assembly that may be extended and retracted, such as for trailer towing applications, where the mirror assembly may be extended to provide enhanced rearward viewing to the driver of the trailer pulling vehicle. Examples of extendable and retractable mirror assemblies are described in U.S. Pat. Nos. 5,483,385; 6,116,743; 6,213,609; 6,239,928; 6,276,808; 6,325,518; 6,394,616 and/or 6,497,491, which are hereby incorporated herein by reference in their entireties.

SUMMARY OF THE INVENTION

An exterior rearview mirror assembly (configured for mounting at a side of an equipped vehicle) includes a mirror head, a mounting arm, and an adjustment mechanism operable to adjust the mirror head relative to the mounting arm between a retracted and an extended position. The mounting arm comprises a dual or twin mounting arm and the adjustment mechanism is disposed at the mirror head and attaches to both an upper and lower mounting arm via links or linkages that are pivotable relative to the mounting arm via an actuator to move the mirror head between the retracted and extended positions.

For example, a vehicular exterior rearview mirror assembly includes a mirror head having a mirror casing and a mirror reflective element and a mounting arm configured for attachment at a side of a vehicle. The mirror head is adjustably mounted at the mounting arm via a link. The link includes a first end pivotally attached to the mirror head and a second end pivotally attached to the mounting arm. With the mounting arm attached at the side of the vehicle, the mirror head is adjustable relative to the mounting arm between a retracted position and an extended position. In the retracted position, the mirror head is positioned at the side of the vehicle so that the mirror reflective element provides a field of view to a driver of the vehicle that is at least rearward and along the side of the vehicle. In the extended position, the mirror head is extended from the retracted position outward from the side of the vehicle to provide a different field of view to the driver. The mirror head is closer to the side of the vehicle at which the mounting arm is attached when in the retracted position as compared to the extended position. An adjustment mechanism is operable to adjust the mirror head relative to the mounting arm between the retracted position and the extended position. The adjustment mechanism includes an actuator that is operable to pivotally adjust the link. The adjustment mechanism, when the actuator is operated to pivotally adjust the link, moves the mirror head along a path between the retracted position and the extended position. The actuator is disposed at the mirror head so that, when the mirror head moves between the retracted position and the extended position, the actuator travels along the path with the mirror head.

These and other objects, advantages, purposes and features of the present invention will become apparent upon review of the following specification in conjunction with the drawings.

BRIEF DESCRIPTION OF THE DRAWINGS

FIG. 23 is a cross-sectional view of the exterior rearview mirror assembly in the retracted state; and FIG. 24 is a cross-sectional view of the exterior rearview mirror assembly in the extended state.

DESCRIPTION OF THE PREFERRED EMBODIMENTS

Figure 1:
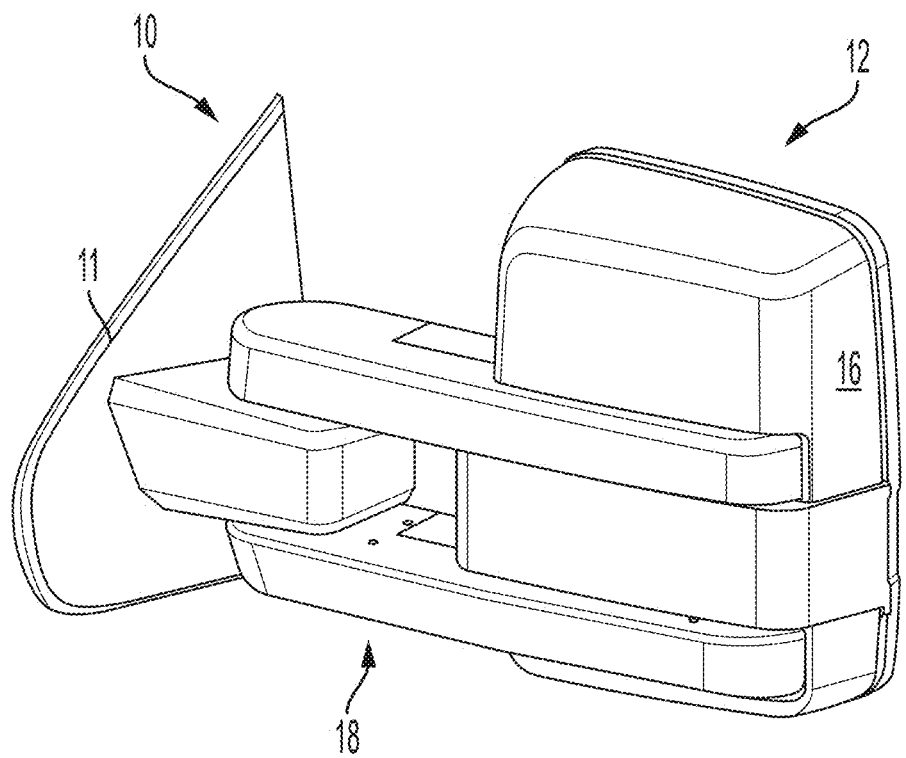
FIG. 1 is a perspective view of an exterior rearview mirror assembly in the retracted state.
Figure 2:
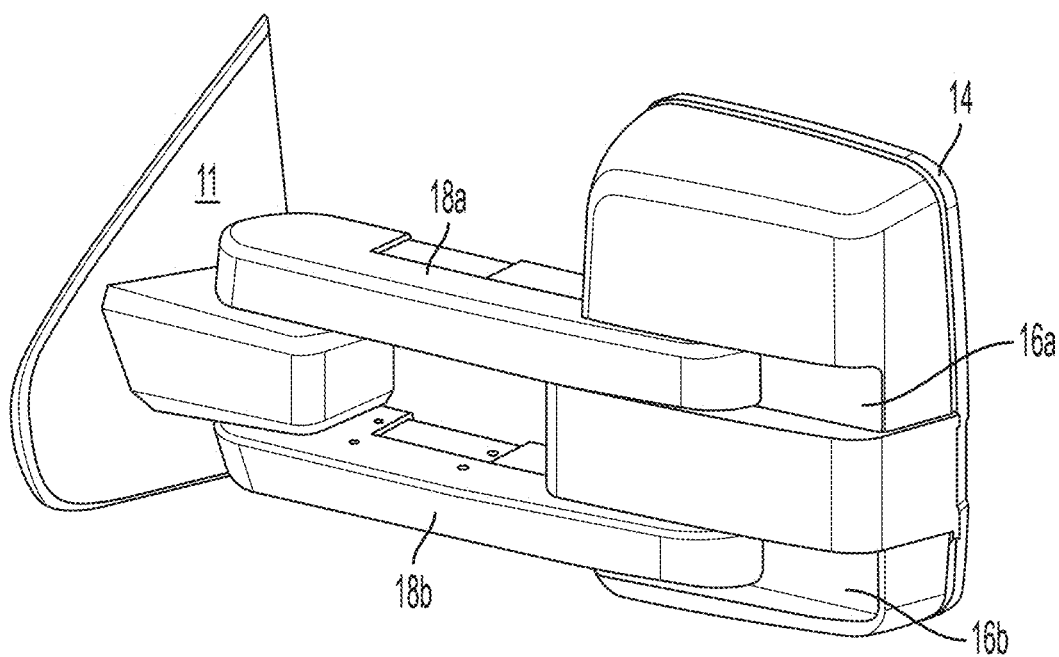
FIG. 2 is a perspective view of the exterior rearview mirror assembly in the extended state.

Referring now to the drawings and the illustrative embodiments depicted therein, an exterior rearview mirror assembly 10 for a vehicle includes a mirror head 12 having a mirror reflective element 14 and a mirror shell or casing 16, with the mirror head being adjustably mounted at a mounting structure or arm 18 and adjustable via an adjustment mechanism or device that adjusts the mirror head between a retracted state (FIG. 1) and an extended state (FIG. 2). The adjustment mechanism is housed within the mirror head and thus moves according to movement of the mirror head. The adjustment mechanism includes an actuator operable to pivot links or linkages that adjust the mirror head relative to the mounting arm. For example, the actuator 28 may be operable to swing or pivot the mirror head between the retracted and extended states via pivoting of an inboard link 30 and an outboard link 32 pivotally attached at the mounting arm 18.

The mounting arm 18 comprises a dual or twin mounting arm, which includes an upper arm 18a and a lower arm 18b that each attach at a base or mounting portion 11 at a side of the vehicle and that each attach at the mirror head 12. Single arm mirrors may have stability issues. For example, and as shown in FIG. 2, when the mirror is in the extended state, a shorter length of the mounting arm 18 is supporting the mirror head 12. A dual or twin-arm design may provide greater structural support to the mirror head when in the extended state as compared to a single arm mirror.

Figure 5:
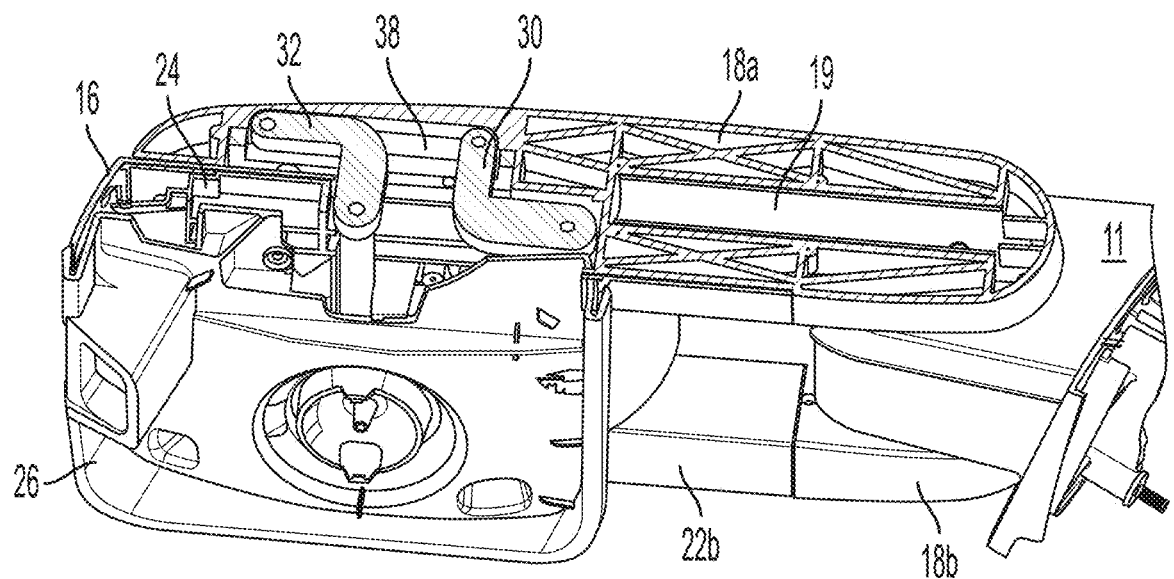
FIG. 5 is a perspective and partial cross-sectional view of the exterior rearview mirror assembly in the retracted state.
Figure 6:
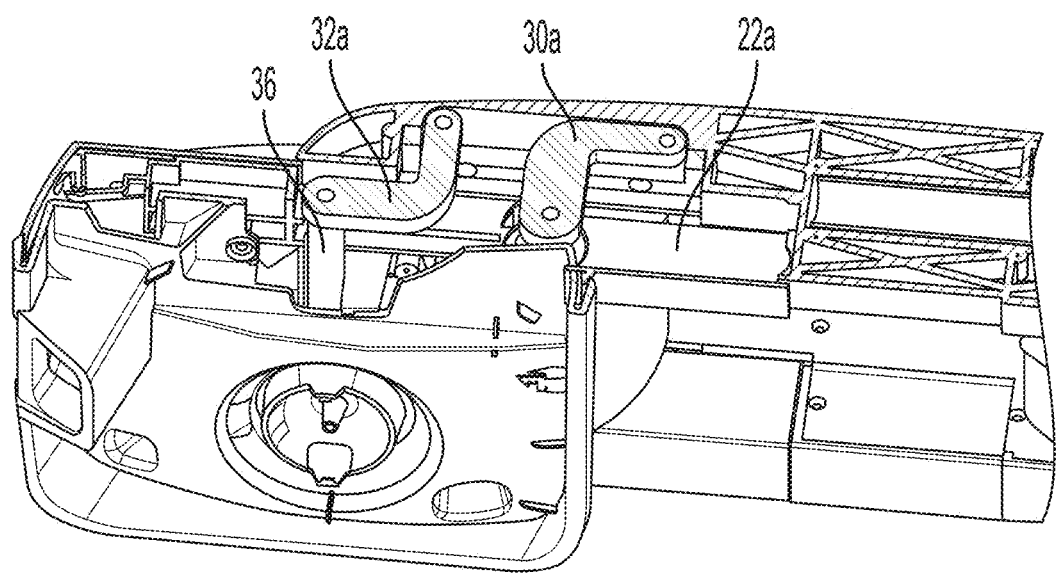
FIG. 6 is a perspective and partial cross-sectional view of the exterior rearview mirror assembly in the extended state.
Figure 7:
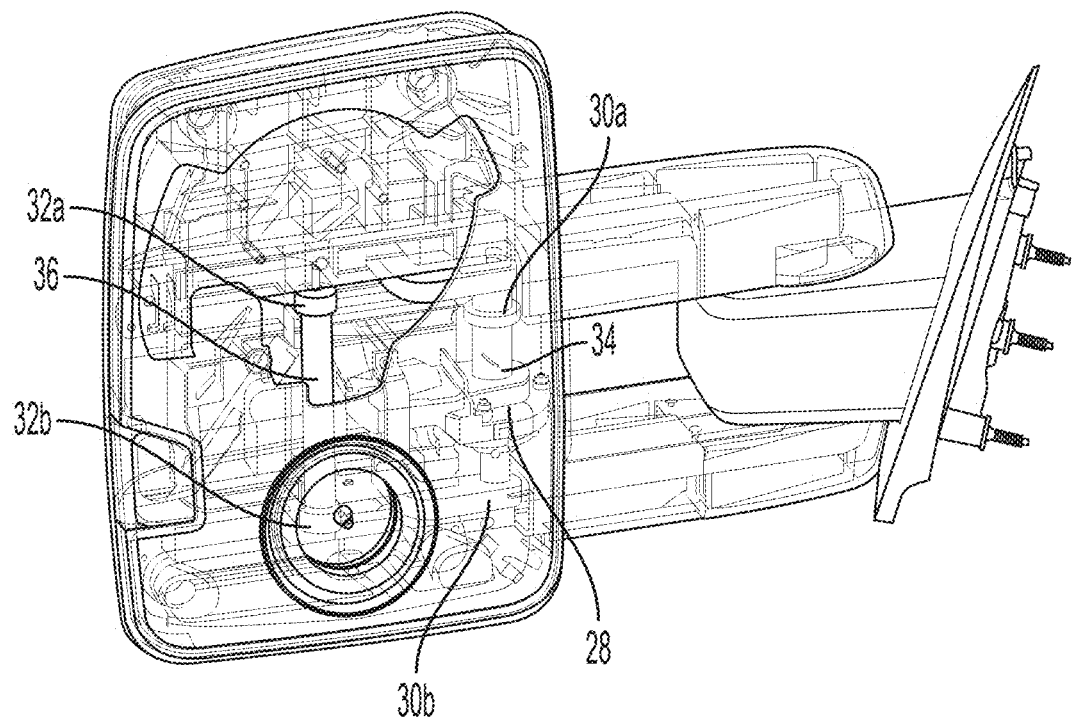
FIG. 7 is a perspective view of the exterior rearview mirror assembly in the retracted state.
Figure 8:
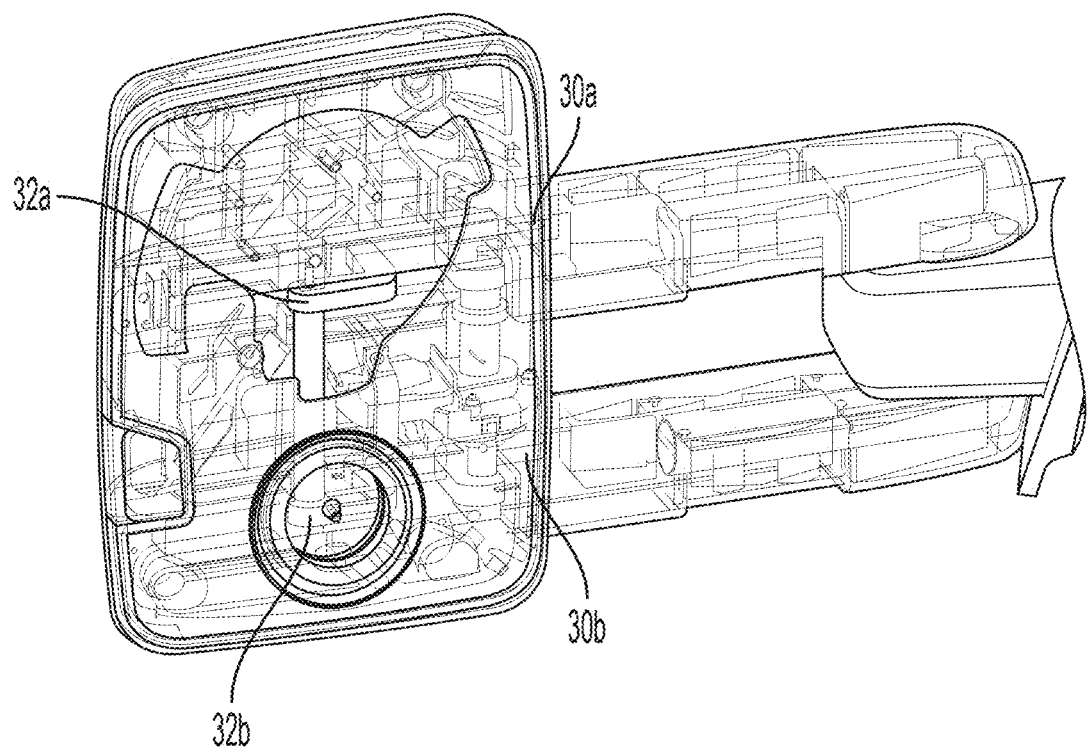
FIG. 8 is a perspective view of the exterior rearview mirror assembly in the extended state.
Figure 9:
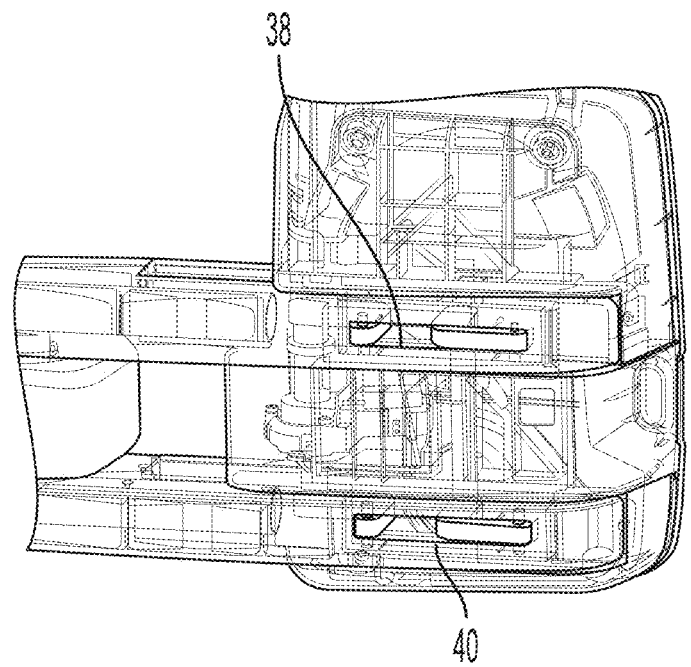
FIG. 9 is another perspective view of the exterior rearview mirror assembly in the retracted state.
Figure 10:
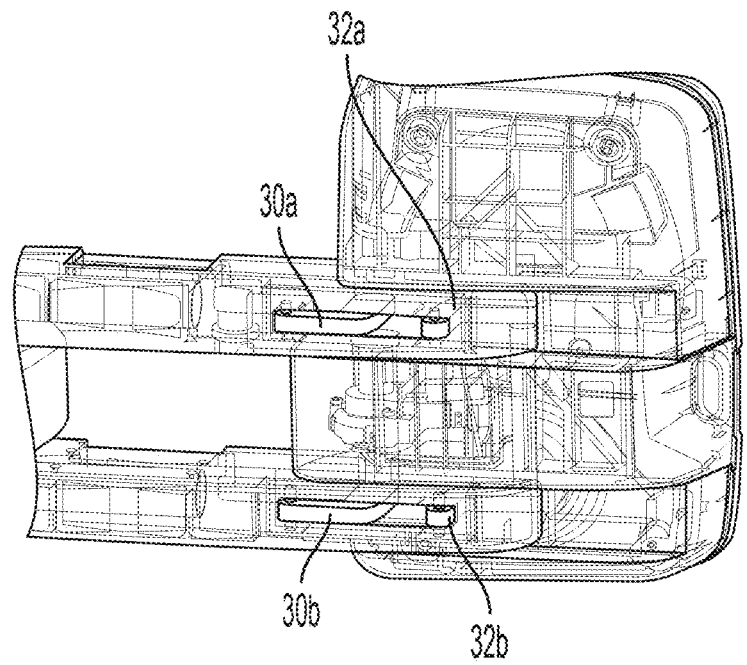
FIG. 10 is another perspective view of the exterior rearview mirror assembly in the extended state.
Figure 11:
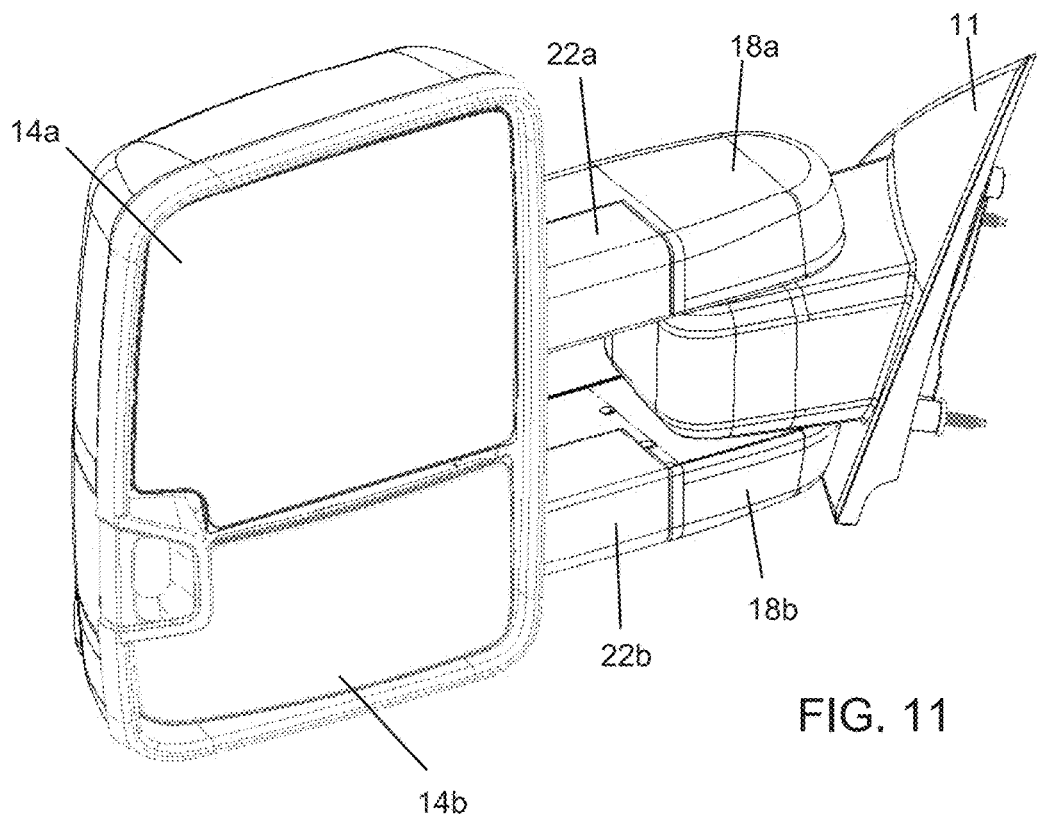
FIGS. 11-14 are perspective views of the exterior rearview mirror assembly in the retracted state.
Figure 12:
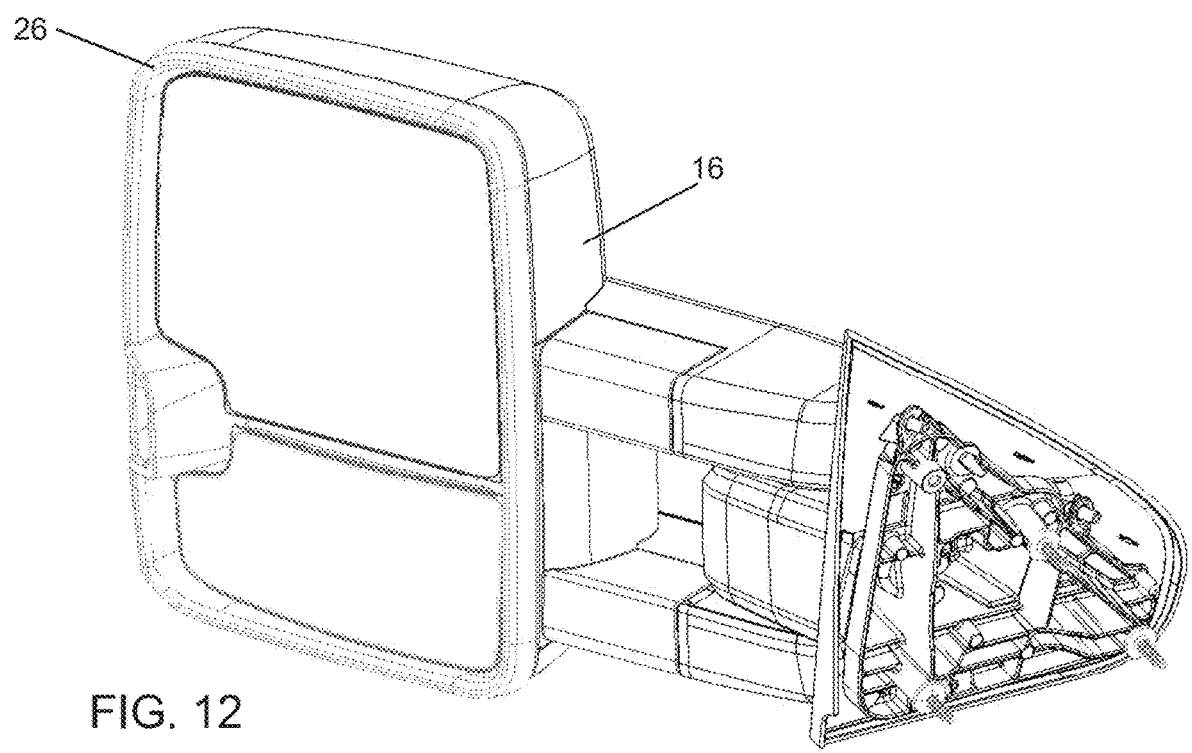
Figure 13:
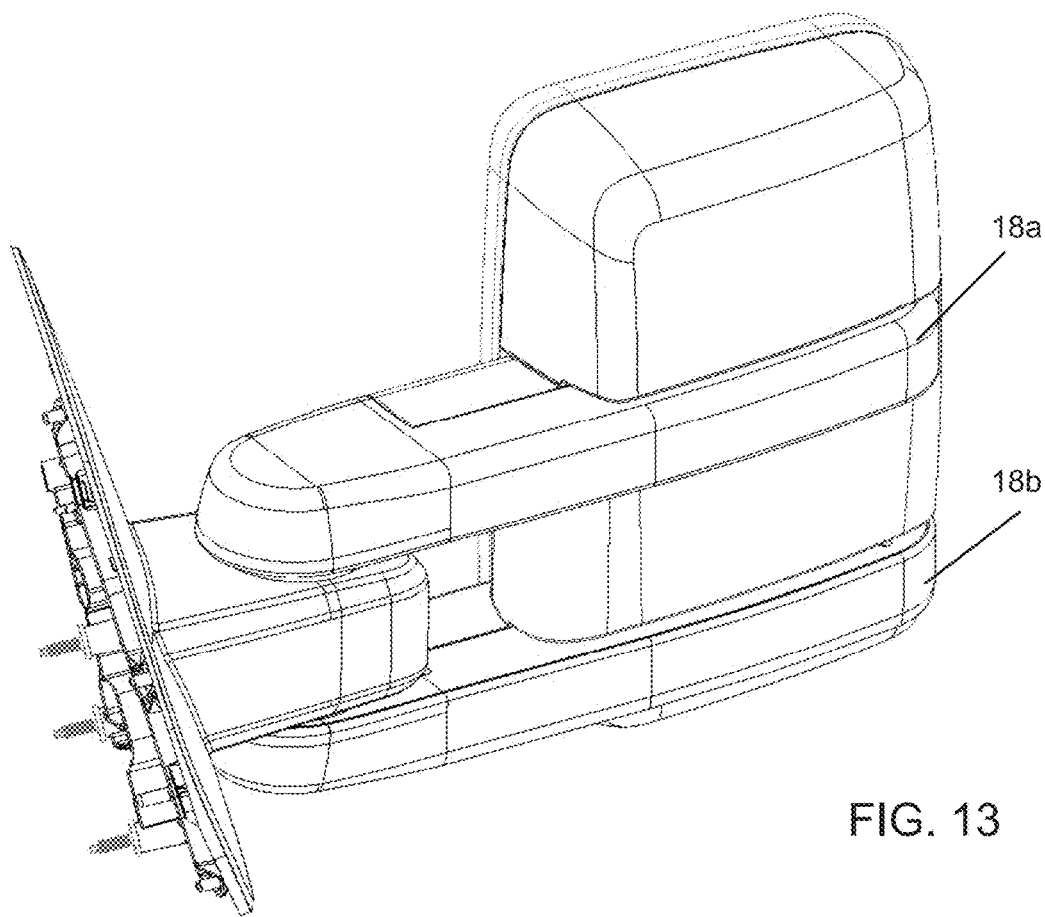
Figure 14:
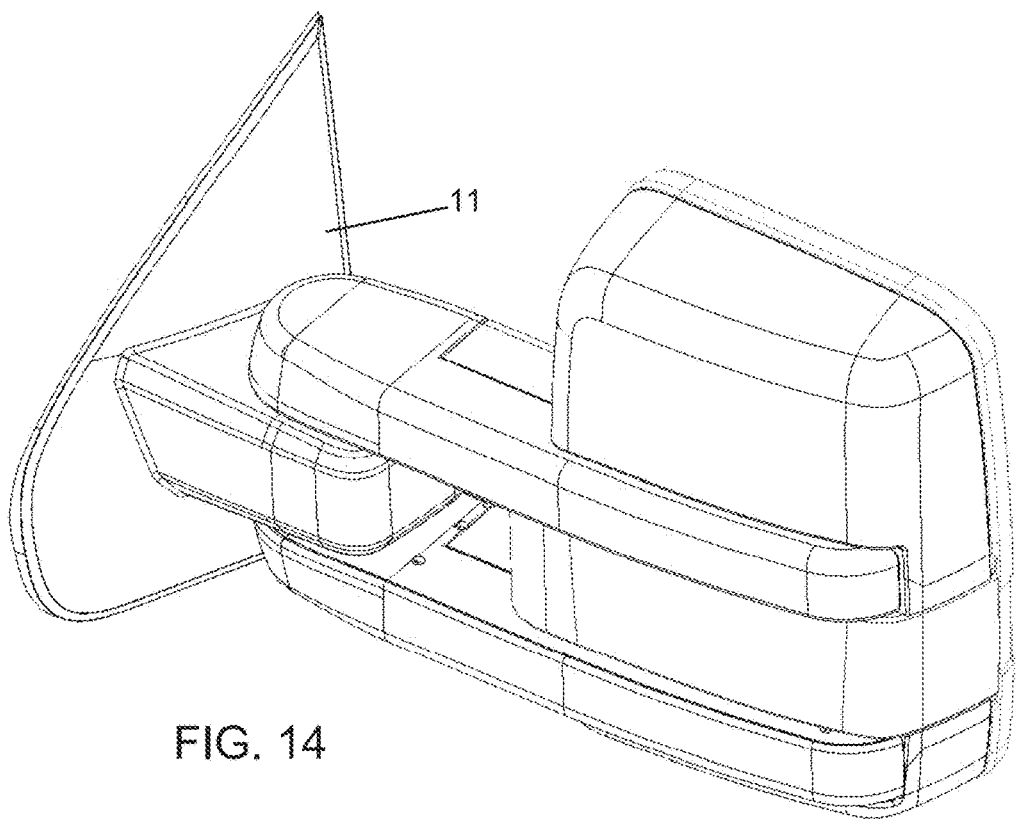
Figure 15:
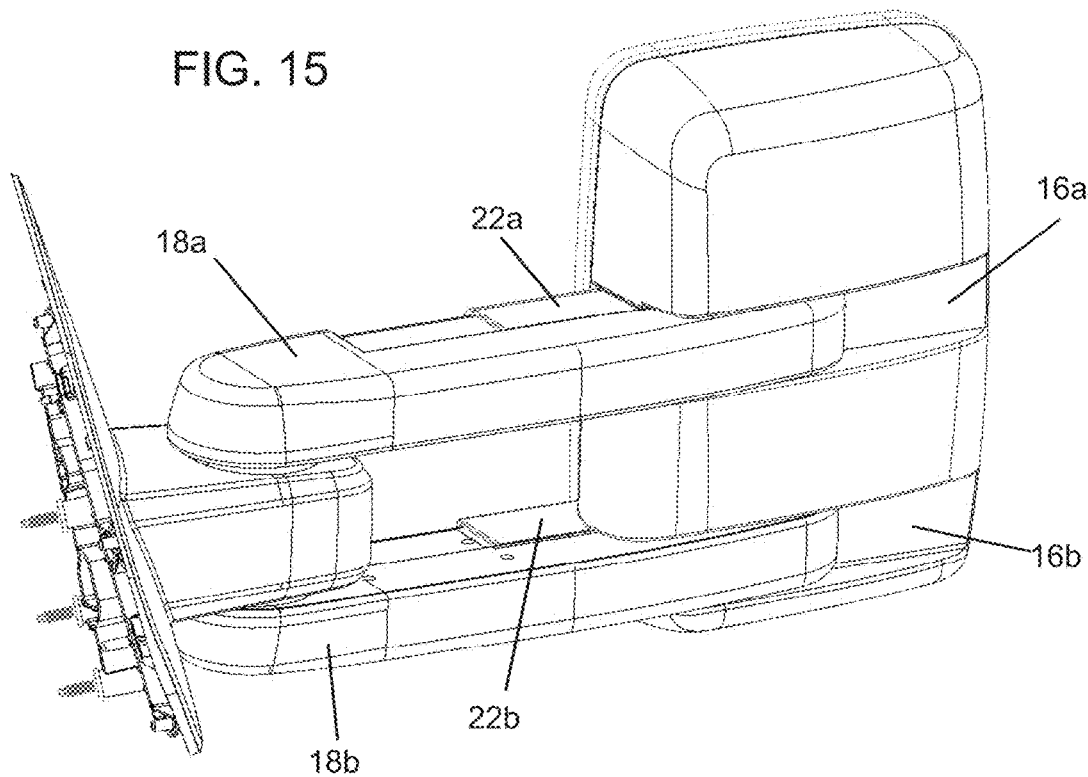
FIGS. 15-18 are perspective views of the exterior rearview mirror assembly in the extended state.
Figure 16:
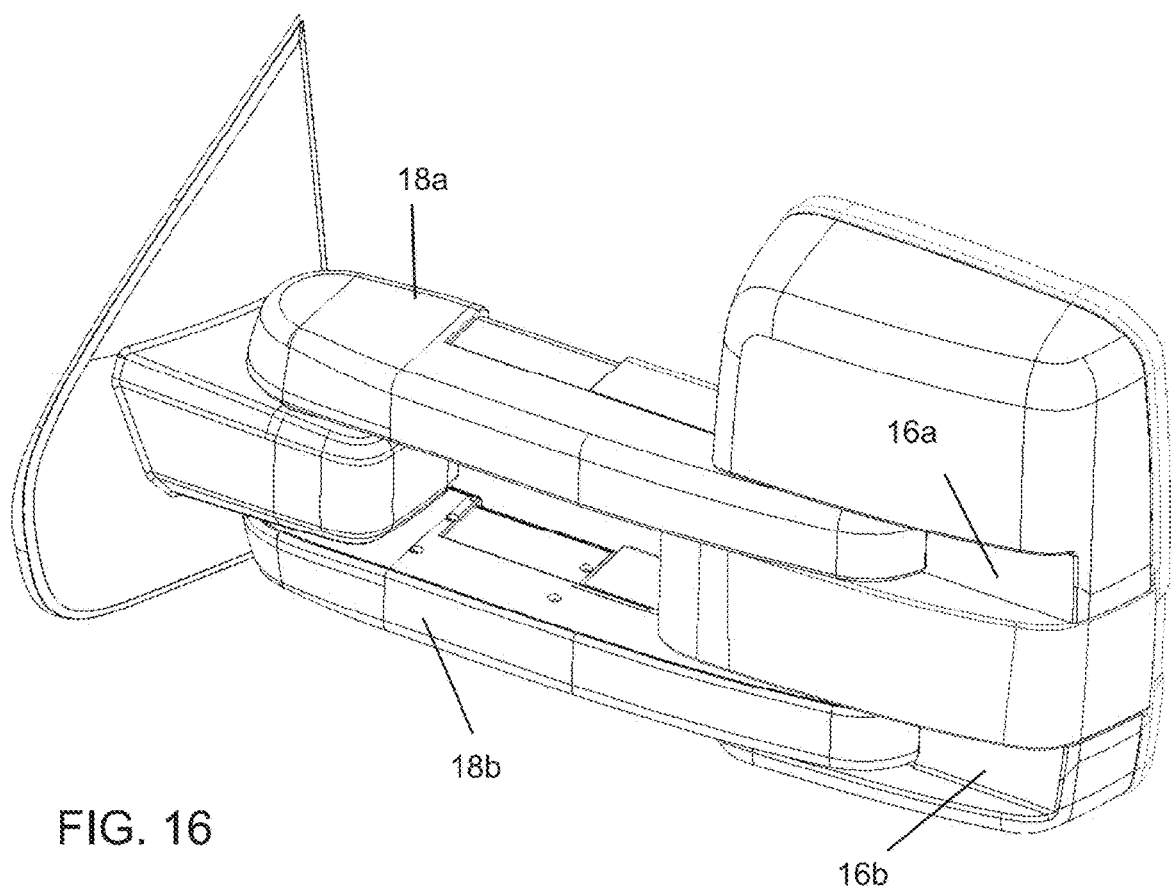
Figure 17:
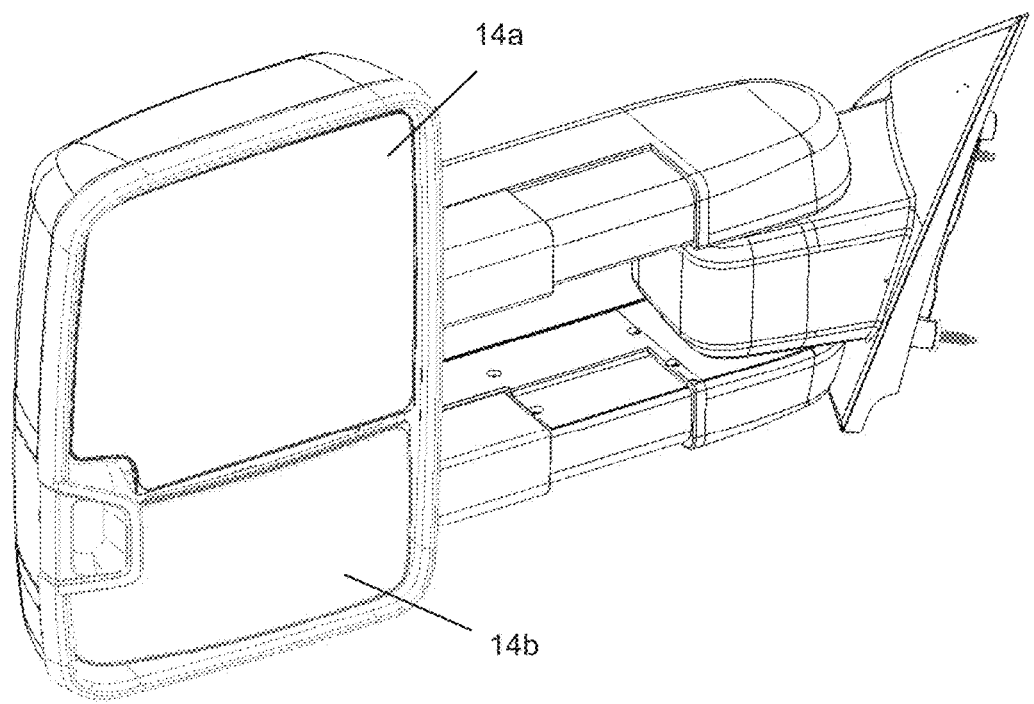
Figure 18:
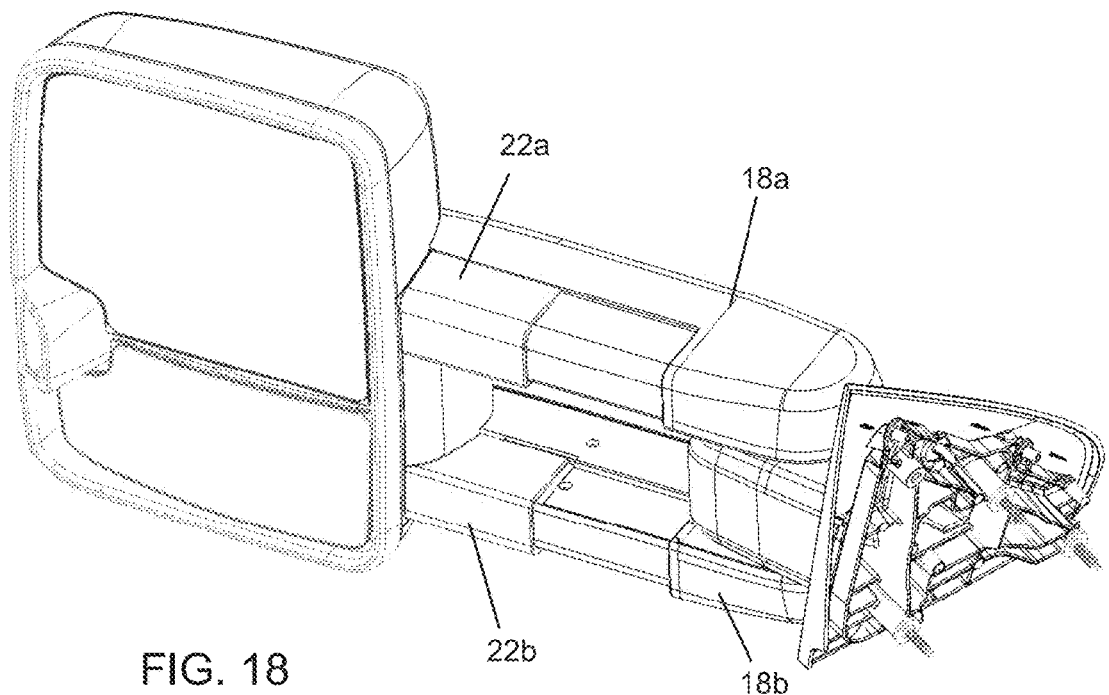
Figure 19:
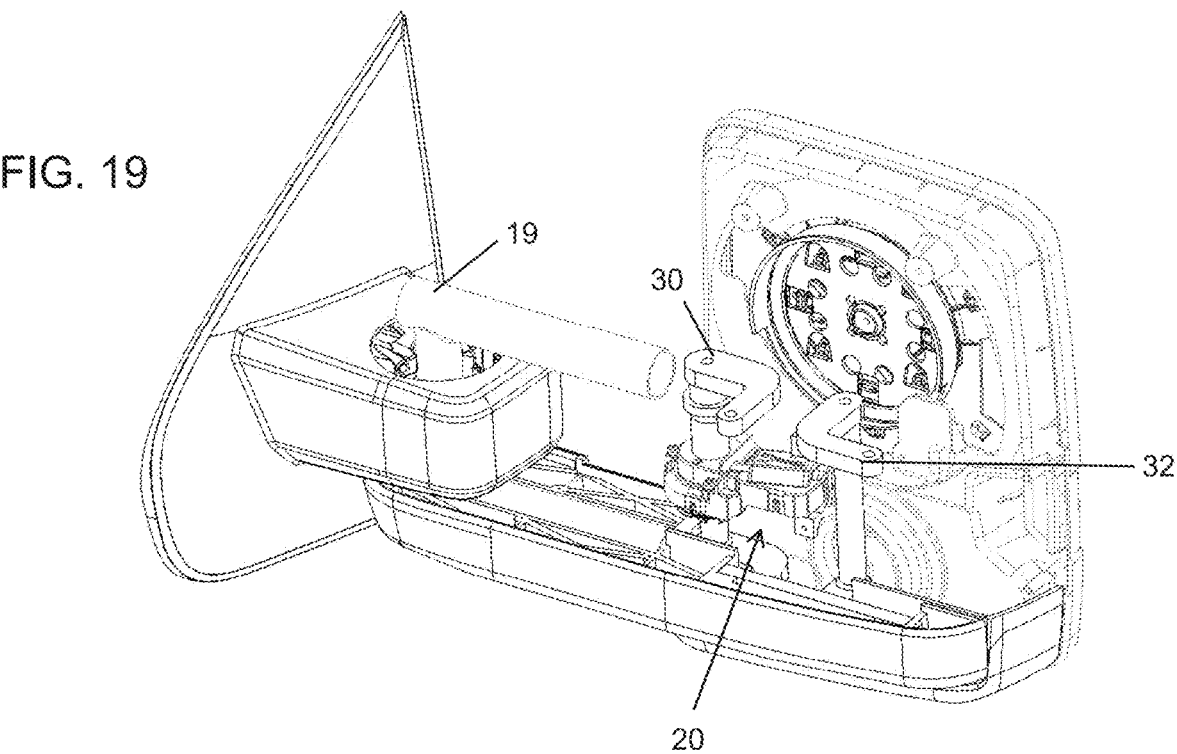
FIG. 19 is a perspective view of the exterior rearview mirror assembly in the retracted state, with the mirror casing, mounting bracket, frame, and upper arm removed to show the adjustment mechanism.
Figure 20:
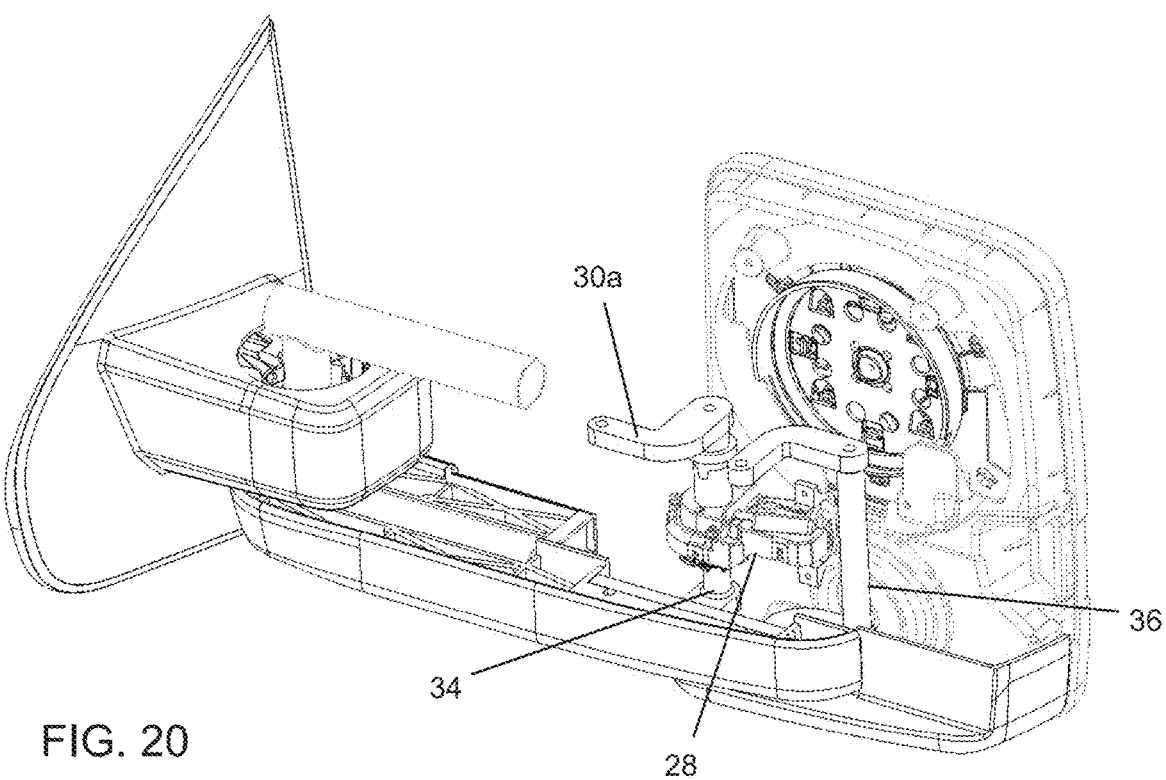
FIG. 20 is a perspective view of the exterior rearview mirror assembly in the extended state, with the mirror casing, mounting bracket, frame, and upper arm removed to show the adjustment mechanism.
Figure 21:
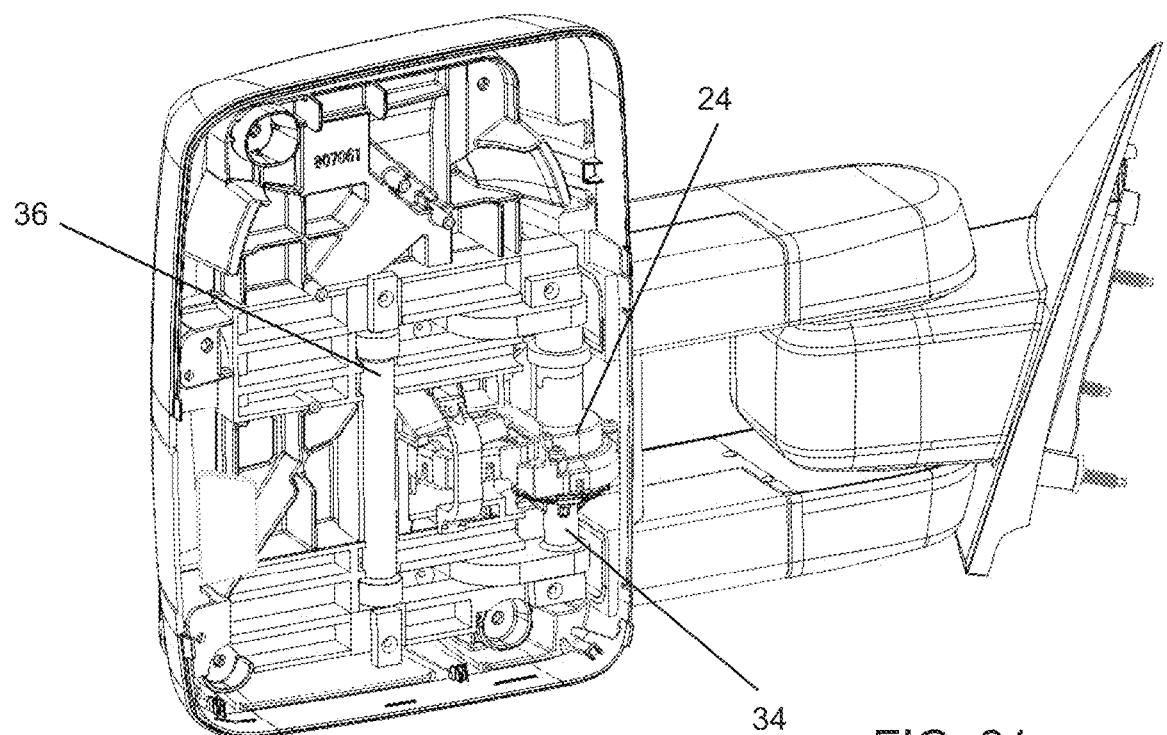
FIG. 21 is a perspective view of the exterior rearview mirror assembly in the retracted state, with the mirror reflective element and bezel removed.
Figure 22:
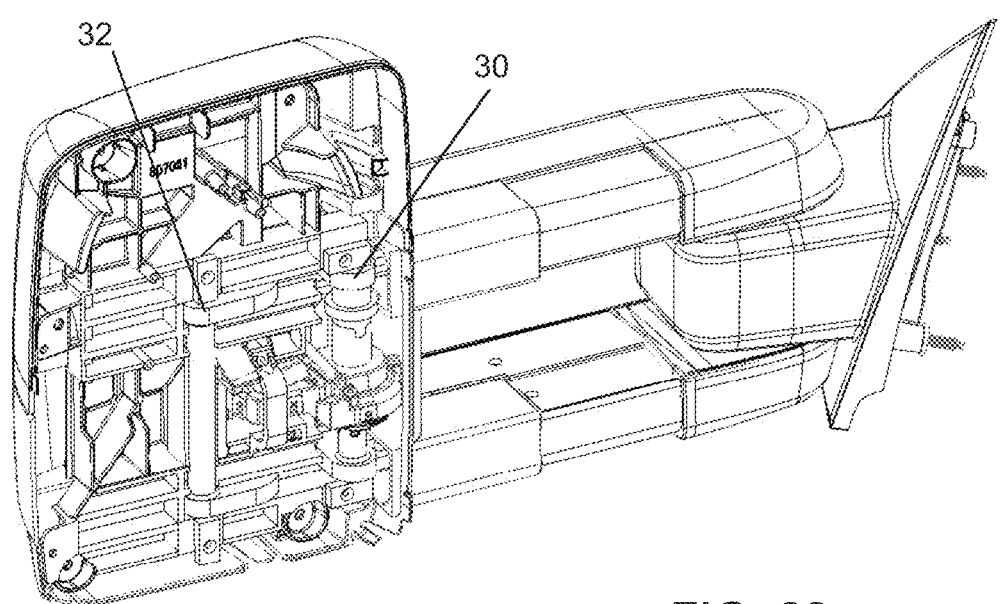
FIG. 22 is a perspective view of the exterior rearview mirror assembly in the extended state, with the mirror reflective element and bezel removed.

The base portion 11 of the mirror assembly is mounted at the side of the host or subject vehicle, with the reflective element 14 providing a rearward field of view along the respective side of the vehicle to the driver of the vehicle. As shown, the base portion 11 provides a protrusion with the upper arm 18a pivotally attaching at an upper surface of the protrusion and the lower arm 18b pivotally attaching at a lower surface of the protrusion. The upper and lower arms may enable powerfold and/or manual pivoting of the mirror head relative to the base portion 11 at the side of the vehicle. The mirror head may be pivotable between a folded or park position, where the mirror head is disposed along the side of the vehicle so that the mirror reflective element 14 faces the side of the vehicle, and an extended position, where the mirror head is pivoted out from the side of the vehicle so that the mirror reflective element provides the field of view rearward and along the side of the vehicle to the driver. The upper and lower arms may pivotally attach at the base portion 11 in any suitable fashion and may comprise any suitable material, such as a plastic or metallic material. Optionally, the upper and lower arms may each comprise a cover portion that snap attaches or is overmolded with or otherwise is received at a core or structural support 19 such as a metallic (e.g., steel or aluminum) rod (FIG. 5).

Figure 3:
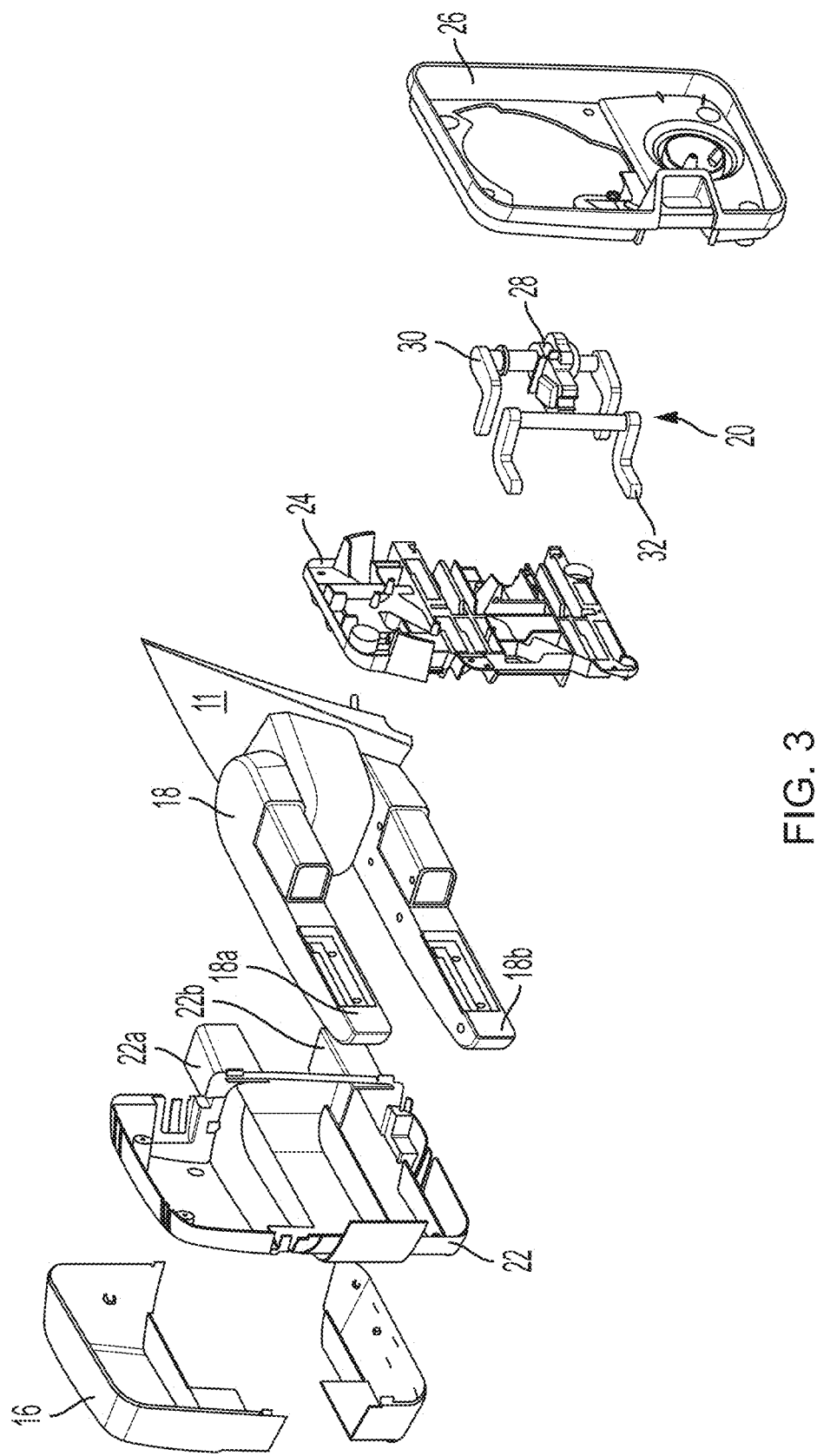
FIG. 3 is an exploded perspective view of the exterior rearview mirror assembly.
Figure 4:
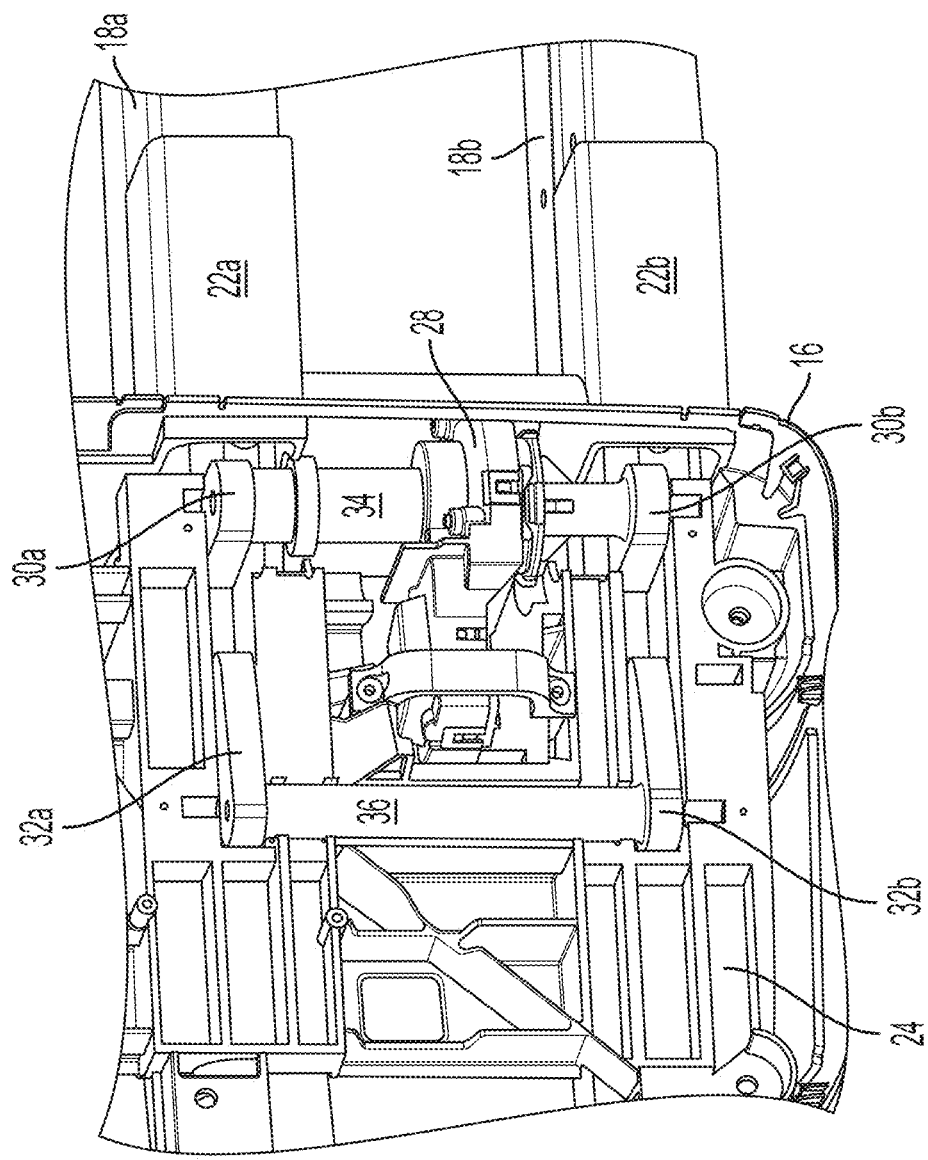
FIG. 4 is a partial view of the exterior rearview mirror assembly, showing the adjustment mechanism disposed at the mirror head.

As shown in FIG. 3, the mirror casing 16 is attached at an inner cap or mounting bracket 22. The rear of the mirror casing 16 may include an upper channel or contour 16a that at least partially receives an outer end portion of the upper mounting arm 18a and a lower channel or contour 16b that at least partially receives an outer end portion of the lower mounting arm 18b. The mounting bracket 22 receives the upper mounting arm 18a in an upper channel or contour 22a and receives the lower mounting arm 18b in a lower channel or contour 22b so that, when the adjustment mechanism 20 adjusts the mirror head 12 between the retracted state and the extended state, the mounting bracket 22 (and therefore mirror head) moves along the mounting arm 18 with the respective upper and lower channels 22a, 22b of the mounting bracket 22 moving along the respective upper and lower mounting arms 18a, 18b. Furthermore, when the mirror head 12 moves along the mounting arm 18, the respective upper and lower channels 16a, 16b of the mirror casing may move along outer end portions of the respective upper and lower mounting arms 18a, 18b. A rear surface of a frame 24 attaches at the mirror casing 16 and/or mounting bracket 22 and the frame 24 retains the adjustment mechanism at a front surface to secure the adjustment mechanism at the mirror head 12. A bezel 26 attaches to the front surface of the frame 24 and may receive or attach at the mirror reflective element 14 at a front or outer surface of the mirror head 12 that provides the rearview to the driver of the vehicle when the mirror assembly 10 is mounted at the vehicle. Optionally, the bezel 26 may receive a mirror attachment plate or back plate and/or a heating pad or any other component that may receive and/or support the mirror reflective element 14 at the outer, driver-facing surface of the mirror assembly 10.

As shown in FIGS. 4-10, the mirror head 12 houses the adjustment mechanism 20, which attaches to the mounting arm 18 and a portion of the mirror head 12 (e.g., the frame 24) and is operable to move the mirror head 12 along a path between the retracted position and the extended position. For example, the adjustment mechanism 20 engages the mounting arm 18 and is electrically operable to move the mirror head 12 along the mounting arm 18 between the retracted position and the extended position. The adjustment mechanism 20 includes a rotary actuator 28 that is operable to pivot an inner or inboard link 30 and/or an outer or outboard link 32. The mirror head 12 is adjustable relative to the mounting arm 18 via activation of the adjustment mechanism 20, where the rotary actuator 28 is operated to pivot the inboard and/or outboard links to extend or retract the mirror head 12 relative to the mounting arm 18 that is mounted at the side of the vehicle. The adjustment mechanism may utilize aspects of the adjustment mechanisms described in U.S. Pat. No. 9,796,334, which is hereby incorporated by reference herein in its entirety.

The adjustment mechanism 20 includes the inboard link 30 and the outboard link 32 pivotally attached at the mounting arm 18 and pivotable via operation of the actuator 28. As shown in the illustrated embodiment, the inboard and outboard links both include respective upper links 30a, 32a and respective lower links 30b, 32b that pivotally attach at respective first ends at the respective upper and lower mounting arms 18a, 18b. For example, respective first ends of the upper links 30a, 32a pivotally attach to the upper mounting arm 18a at an upper arm mounting bracket 38. Similarly, respective first ends of the lower links 30b, 32b pivotally attach to the lower mounting arm 18b at a lower arm mounting bracket 40. The upper link 30a and lower link 30b of the inboard links 30 are attached at respective second ends to an inboard mounting pin or stanchion 34 that spans between the upper and lower links 30a, 30b and between the upper and lower mounting arms 18a, 18b. Similarly, the upper link 32a and lower link 32b of the outboard link 32 are pivotally attached at respective second ends to an outboard mounting pin or stanchion 36 that spans between the upper and lower links 32a, 32b and between the upper and lower mounting arms 18a, 18b. Thus, the inboard and outboard links are pivotally attached at first ends to the mounting arm 18 and pivotally attached at second ends to respective inboard and outboard stanchions 34, 36. Pivotable connection between the first ends of the upper and lower links to the respective upper and lower arm mounting brackets defines parallel pivot axes of the inboard and outboard links so that, when a rotational force rotates or pivots the inboard stanchion 34, the inboard and outboard links pivot at the respective first ends to move the mirror head 12 along the mounting arm 18.

The actuator 28 is disposed at the frame 24 and engages the inboard stanchion 34 and is operable to pivot the inboard link 30, such as by rotating the inboard stanchion 34 via a drive motor of the actuator 28. As the stanchion 34 pivots or rotates, the upper and lower inboard links 30*a*, 30*b* (which may be fixedly attached or non-rotatably attached at respective ends of the stanchion 34), pivot to impart movement of the mirror head 12 relative to the mounting arms 18. In the illustrated embodiment, the inboard and outboard links 30,32 are not connected, but the links are configured so that when the actuator 28 is operated to pivot the inboard links 30, the inboard links 30 will pivot due to the operation of the actuator (i.e., the rotational force applied to the inboard stanchion) and the outboard link 32 will pivot according to movement of the inboard link 30 and the mirror head 12 relative to the mounting arm 18. Optionally, the inboard and outboard links may be connected, such as via a connection rod or linkage. Optionally, the actuator 28 may be disposed at the outboard stanchion 36 and operable to pivot the outboard link 32, or the actuator 28 may be disposed at both the inboard and outboard stanchions and operable to pivot the inboard and outboard links together and in tandem.

The actuator 28 attached at the inboard stanchion 34 is fixed to the frame 24 of the mirror head 12 (such as via a bracket or other suitable method) so that when the actuator 28 is electrically operated to pivot the inboard link 30, the inboard link 30 pivots relative to the frame 24 and relative to the mounting arm 18 to impart a pulling or pushing force on the actuator 28 to move the mirror head 12 along the mounting arm 18 between the retracted and extended positions.

The upper and lower links of the inboard and outboard links each extend from the respective second ends connected at the respective inboard and outboard stanchions and comprise planar, angled linkages (such as, for example, L-shaped or 90 degree angled linkages or other suitable non-zero angle, such as an angle between, for example, 60 degrees and 120 degrees, or between 80 degrees and 100 degrees), with the first end pivotally attached at the mounting arm 18 and the second end pivotally attached at the respective stanchions. A first portion or length of the angled link extends from the first end and a second portion or length extends from the second end. The first and second lengths of the respective angled links are integrally formed or joined together and angled relative to one another (such as an oblique angle or at 90 degrees) to provide the angled linkages (e.g., L-shaped). As shown in the illustrated embodiment, the upper and lower links of both the inboard and outboard links pivot together and in tandem about their respective stanchions so that, when the mirror head 12 is pivoted between the retracted and extended positions, the orientation of the upper links 30*a*, 32*a* relative to the upper mounting arm 18*a* will mirror or match the orientation of the lower links 30*b*, 32*b* relative to the lower mounting arm 18*b* and vice versa.

For example, when the mirror head 12 is in the retracted state (FIGS. 5, 7, and 9), the upper and lower inboard links 30*a*, 30*b* are positioned such that the first lengths extending from first ends attached at the respective mounting brackets 38, 40 are at an angle (e.g., 90 degrees) relative to the mounting arm 18 and the second lengths extending from second ends attached at the inboard stanchion 34 are substantially parallel to the mounting arm 18. The upper and lower outboard links 32*a*, 32*b*, with the mirror head 12 in the retracted state, are positioned such that the first lengths extending from first ends attached at the respective mounting brackets 38, 40 are substantially parallel to the mounting arm 18 and the second lengths extending from second ends attached at the outboard stanchion 36 are at an angle (e.g., 90 degrees) relative to the mounting arm 18.

When the actuator is operated to move the mirror head 12 from the retracted state to the extended state, the inboard and outboard links pivot or rotate outboard to move or swing the mirror head 12 along the mounting arm 18 and away from the side of the vehicle. That is, the second ends of the inboard and outboard links are pivoted outward along the mounting arm 18 relative to the first ends pivotally attached at the mounting arm 18. Thus, when in the extended state (FIGS. 6, 8, and 10), the upper and lower inboard links 30*a*, 30*b* are positioned such that the first lengths are substantially parallel to the mounting arm and the second lengths are at an angle relative to the mounting arm 18. The upper and lower outboard links 32*a*, 32*b*, with the mirror head 12 in the extended state, are positioned such that the first lengths are at an angle relative to the mounting arm 18 and the second lengths are substantially parallel to the mounting arm 18.

As shown in FIGS. 11-18, as the mirror assembly 10 is adjusted between the retracted position (FIGS. 11-14) and the extended position (FIGS. 15-18), the mirror head 12 moves or swings along the mounting arm 18. The upper and lower mounting arms 18*a*, 18*b* each comprise guide or rail portions that receive the respective channels 22*a*, 22*b* of the bracket 22 so that, as the mirror head 12 moves along the mounting arm 18, the channels of the bracket 22 move along the guide portions of the mounting arms 18. The mounting arms 18*a*, 18*b* also each include outer end portions that are received in contours 16*a*, 16*b* of the mirror casing 16 so that as the mirror head 12 moves along the mounting arms 18, the end portions move along the contours of the mirror casing 16.

Thus, when actuated (such as via actuation of a user input by the driver of the vehicle) to move the mirror head 12 from its retracted state to its extended state, the actuator 28 pivots the inboard link 30, which moves the inboard portion of the mirror head 12, which imparts a corresponding movement of the outboard link 32, which pivots relative to the mounting arm 18 as the mirror head 12 is moved. The mirror head 12 thus moves relative to the mounting arm 18, such as by arcuately swinging or moving along a path via pivoting of the links 30, 32. As shown, the mirror head 12 moves along the mounting arm 18 between the retracted and extended position.

As shown in FIGS. 23 and 24, first ends of the inboard and outboard links are at least partially received in recesses at the mounting arm brackets 38, 40 of the upper and lower mounting arms 18*a*, 18*b*, and the recesses accommodate the pivotal movement of the links. Similarly, recesses or cavities may be formed within the body of the mirror head 12, such as between the frame 24 and the bezel 26, to accommodate movement of the links. Optionally, the lengths and configurations of the links 30, 32 are selected such that, as the mirror head 12 moves towards its extended state, the mirror head 12 is angled or pivoted or canted rearward and towards the side of the vehicle, such that the mirror head travels along a path that is offset from the mounting arm 18. Optionally, the mounting arm may be curved or angled corresponding to a non-linear path of travel of the mirror head between the retracted and extended positions.

Optionally, and such as shown in FIGS. 11, 12, 17, and 18, the mirror reflective element 14 includes one or more portions, such as an upper mirror reflective element 14*a* and a lower mirror reflective element 14*b*, that provide different views to the driver of the vehicle. For example, the upper mirror reflective element 14*a* may provide an adjustable unit magnification rearward view, while the lower mirror reflective element 14*b* may provide a fixed wide angle or curved mirror element and wider angle rearward view. Optionally, the upper and lower mirror reflective elements 14a, 14b may be independently adjustable to provide different rearward views to the driver of the vehicle.

Optionally, the mirror assembly may allow for manual extension and retraction of the mirror head, such as by utilizing aspects of the power extend actuator described in U.S. Publication No. US-2021-0107406, which is hereby incorporated by reference herein in its entirety. Thus, the mirror assembly provides an adjustment mechanism that is operable to extend or retract or move the mirror head between its retracted and extended positions or states. The adjustment mechanism is housed within the mirror head and thus moves with the mirror head when the mirror head is moved between the retracted and extended positions. The mirror head is mounted at the side of a vehicle at a dual or twin mounting arm and the adjustment mechanism includes upper and lower links that attach at the respective mounting arms. When the adjustment mechanism is operated to move the mirror head between the retracted and extended positions, an actuator pivots the links relative to the mounting arm to slide or move the mirror head along a linear path defined by the mounting arm.

The mirror assembly may comprise any suitable mirror assembly or structure or housing. Optionally, the mirror assembly may utilize aspects of the mirror assemblies described in U.S. Publication No. US-2015-0224930, which is hereby incorporated herein by reference in its entirety. In the illustrated embodiment, the mirror assembly comprises a powerfold mirror assembly that includes a powerfold actuator that is operable to pivot the mounting structure or arm and the mirror head relative to the base portion. The powerfold actuator may operate responsive to a user input to pivot the mounting arm and mirror head between a use position (as shown) and a folded position, where the arm and mirror head may be disposed generally along the side of the vehicle. The upper and lower mounting arms pivot in tandem relative to the protrusion of the base portion. Although shown as pivotally mounting at the base portion, the mounting arm or structure may be fixedly mounted at a base portion or at the side of the vehicle.

Optionally, the exterior rearview mirror assembly may include a spotter mirror element to provide a wide angle rearward field of view to the driver of the vehicle equipped with the mirror assembly. The spotter mirror element may utilize aspects of the mirrors described in U.S. Pat. Nos. 8,917,437; 7,255,451; 7,195,381; 6,717,712; 7,126,456; 6,315,419; 7,097,312; 6,522,451; 6,315,419; 5,080,492; 5,050,977; 5,033,835; 8,736,940; 8,021,005; 7,934,844; 7,887,204; 7,824,045 and/or 7,748,856, which are hereby incorporated herein by reference in their entireties.

Optionally, the exterior rearview mirror assembly may include a turn signal indicator or the like for indicating to drivers of other vehicles that the driver of the equipped vehicle has actuated a turn signal of the vehicle. The turn signal indicator of the exterior rearview mirror assembly may utilize aspects of the mirror systems described in U.S. Pat. Nos. 6,198,409; 5,929,786 and/or 5,786,772, and/or International Publication Nos. WO 2007/005942 and/or WO 2008/051910, which are hereby incorporated herein by reference in their entireties. The signal indicator or indication module may include or utilize aspects of various light modules or systems or devices, such as the types described in U.S. Pat. Nos. 8,764,256; 7,581,859; 6,227,689; 6,582,109; 5,371,659; 5,497,306; 5,669,699; 5,823,654; 6,176,602 and/or 6,276,821, and/or U.S. Publication No. US-2013-0242586, and/or U.S. Publication No. US-2015-0224919, and/or International Publication Nos. WO 2006/124682 and/or WO 2015/148611, which are all hereby incorporated herein by reference in their entireties.

Such an indicator or indicators may function as a lane change assist (LCA) indicator or indicators and/or a blind spot indicator or indicators. Such blind spot indicators are typically activated when an object is detected (via an object detection or side object or blind spot detection system or the like such as described in U.S. Pat. Nos. 5,550,677; 5,760,962; 6,097,023; 5,796,094; 5,715,093; 7,526,103; 6,250,148; 6,341,523; 6,353,392; 6,313,454; 5,670,935; 6,201,642; 6,396,397; 6,498,620; 6,717,610; 6,757,109; 7,005,974; 7,038,577; 6,882,287; 6,198,409; 5,929,786; 5,786,772; 7,038,577; 6,882,287; 6,198,409; 5,929,786; 5,786,772; 7,881,496 and/or 7,720,580, and/or International Publication Nos. WO 2007/005942 and/or WO 2004/047421, which are hereby incorporated herein by reference in their entireties) at the side and/or rear of the vehicle (at the blind spot) and when the turn signal is also activated, so as to provide an alert to the driver of the host vehicle that there is an object or vehicle in the lane next to the host vehicle at a time when the driver of the host vehicle intends to move over into the adjacent lane.

Optionally, the exterior mirror element of a mirror assembly may include heater pad or film or element at a rear surface of the mirror reflective element. The heater pad or element at the rear surface of the glass substrate may comprise a mirror defrost/demisting heater and may provide an anti-fogging of de-fogging feature to the exterior mirror assembly, and may utilize aspects of the heater elements or pads described in U.S. Pat. Nos. 8,058,977; 7,400,435; 5,808,777; 5,610,756 and/or 5,446,576, and/or U.S. Pat. Publication Nos. US-2008-0011733 and/or US-2011-0286096, which are all hereby incorporated herein by reference in their entireties.

The reflective elements of the mirror assemblies described above may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or International Publication No. WO 2010/114825, which are hereby incorporated herein by reference in their entireties.

Optionally, it is envisioned that aspects of the mirror assembly may be suitable for a rearview mirror assembly that comprises a non-electro-optic mirror assembly (such as a generally planar or optionally slightly curved mirror substrate) or an electro-optic or electrochromic mirror assembly. Optionally, the rearview mirror assembly may comprise a mirror assembly of the types described in U.S. Pat. Nos. 7,420,756; 7,289,037; 7,274,501; 7,338,177; 7,255,451; 7,249,860; 6,318,870; 6,598,980; 5,327,288; 4,948,242; 4,826,289; 4,436,371 and/or 4,435,042, which are hereby incorporated herein by reference in their entireties. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the mirror assembly and actuator and adjustment mechanism.

Optionally, the reflective element of the mirror assemblies described herein may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or International Publication Nos. WO 2010/124064 and/or WO 2011/044312, and/or U.S. Pat. Pub. No. US-2006-0061008, which are all hereby incorporated herein by reference in their entireties.

Optionally, the exterior rearview mirror assembly may include an imaging sensor (such as a sideward and/or rearward facing imaging sensor or camera that has a sideward/rearward field of view at the side of the vehicle at which the exterior mirror assembly is mounted) that may be part of or may provide an image output for a vehicle vision system, such as a lane departure warning system or object detection system or blind zone alert system or surround view vision system other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 8,786,704; 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, which are all hereby incorporated herein by reference in their entireties. Optionally, for example, the vehicle vision system (utilizing a forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described International Publication Nos. WO 2010/099416; WO 2011/028686; WO 2012/075250; WO 2013/019795; WO 2012-075250; WO 2012/154919; WO 2012/0116043; WO 2012/0145501; WO 2012/0145313; WO 2012/145822; WO 2013/081985; WO 2013/086249 and/or WO 2013/109869, and/or U.S. Publication No. US-2011-0162427, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, the vehicular exterior rearview mirror assembly comprising:
    a mounting arm configured for attachment at a side of a vehicle;
    a mirror head having a mirror reflective element;
    wherein the mirror head is mounted at the mounting arm via an adjustment mechanism;
    wherein, with the mounting arm attached at the side of the vehicle, the mirror head is adjustable relative to the mounting arm between (i) a retracted position, where the mirror head is positioned at the side of the vehicle so that the mirror reflective element provides a rearward view to a driver of the vehicle that is at least rearward and along the side of the vehicle, and (ii) an extended position, where the mirror head is extended from the retracted position outward from the side of the vehicle to provide a different rearward view to the driver of the vehicle, and wherein the mirror head is closer to the side of the vehicle at which the mounting arm is attached when in the retracted position as compared to the extended position;
    wherein the adjustment mechanism is operable to adjust the mirror head relative to the mounting arm between the retracted position and the extended position;
    wherein the adjustment mechanism comprises an actuator disposed at the mirror head, and wherein the actuator is electrically operable to pivotally adjust a link, and wherein the link comprises (i) a first end pivotally attached at the mirror head, and (ii) a second end pivotally attached at the mounting arm;
    wherein the adjustment mechanism, when the actuator electrically operates to pivotally adjust the link, moves the mirror head along a path between the retracted position and the extended position; and
    wherein, when the actuator electrically operates and the adjustment mechanism moves the mirror head between the retracted position and the extended position, the actuator travels along the path in tandem with the mirror head.

2. The vehicular exterior rearview mirror assembly of claim 1, wherein the mounting arm comprises an upper arm and a lower arm, and wherein the link comprises (i) an upper portion that pivotally attaches at the mirror head and at the upper arm, and (ii) a lower portion that pivotally attaches at the mirror head and at the lower arm.

3. The vehicular exterior rearview mirror assembly of claim 2, wherein the adjustment mechanism comprises a stanchion connecting the upper portion and the lower portion, and wherein the stanchion is pivotally attached at the mirror head, and wherein the upper portion and the lower portion are non-pivotally attached at the stanchion.

4. The vehicular exterior rearview mirror assembly of claim 3, wherein, when the actuator is electrically operated, the actuator rotates the stanchion to pivotally adjust the upper portion and the lower portion of the link together and in tandem with one another.

5. The vehicular exterior rearview mirror assembly of claim 4, wherein the upper portion pivotally attaches at an upper mounting bracket of the upper arm and the lower portion pivotally attaches at a lower mounting bracket of the lower arm, and wherein the actuator is fixed to the mirror head.

6. The vehicular exterior rearview mirror assembly of claim 1, wherein the link comprises an inboard link and an outboard link, and wherein respective first ends of the inboard and outboard links pivotally attach at discrete positions at the mirror head, and wherein respective second ends of the inboard and outboard links pivotally attach at discrete positions at the mounting arm.

7. The vehicular exterior rearview mirror assembly of claim 6, wherein the respective second ends of the inboard and outboard links pivotally attach at discrete positions of a mounting bracket of the mounting arm.

8. The vehicular exterior rearview mirror assembly of claim 6, wherein the inboard and outboard links each comprise an L-shaped link having (i) a first length extending from the respective first end and (ii) a second length extending from the respective second end and joined to the respective first length at an angle relative to the respective first length.

9. The vehicular exterior rearview mirror assembly of claim 8, wherein, when the mirror head is in the retracted position, the second length of the inboard link and the first length of the outboard link are perpendicular to the mounting arm, and wherein, when the mirror head is in the extended position, the first length of the inboard link and the second length of the outboard link are perpendicular to the mounting arm.

10. The vehicular exterior rearview mirror assembly of claim 6, wherein the actuator is electrically operable to pivotally adjust the inboard link, and wherein the outboard link is pivotally adjusted according to adjustment of the inboard link.

11. The vehicular exterior rearview mirror assembly of claim 6, wherein the mounting arm comprises an upper arm and a lower arm, and wherein the inboard and outboard links each comprise, respectively, (i) an upper portion that pivotally attaches at the mirror head and at the upper arm, and (ii) a lower portion that pivotally attaches at the mirror head and at the lower arm.

12. The vehicular exterior rearview mirror assembly of claim 11, wherein the inboard link comprises an inboard stanchion connecting the upper and lower portions of the inboard link, and wherein the inboard stanchion is pivotally attached at the mirror head and the upper portion and lower portion of the inboard link are non-pivotally connected to the inboard stanchion, and wherein the outboard link comprises an outboard stanchion connecting the upper and lower portions of the outboard link, and wherein the outboard stanchion is pivotally attached at the mirror head and the upper portion and the lower portion of the outboard link are non-pivotally connected to the outboard stanchion.

13. The vehicular exterior rearview mirror assembly of claim 12, wherein, when the actuator is electrically operated, the actuator rotates the inboard stanchion to pivotally adjust the upper and lower portions of the inboard link together and in tandem, and wherein the outboard link is pivotally adjusted according to adjustment of the inboard link.

14. The vehicular exterior rearview mirror assembly of claim 1, wherein the path is along the mounting arm.

15. The vehicular exterior rearview mirror assembly of claim 1, wherein the path is offset from the mounting arm.

16. The vehicular exterior rearview mirror assembly of claim 1, wherein the adjustment mechanism is operable to adjust the mirror head relative to the mounting arm in response to a user input disposed in the vehicle, and wherein the user input is actuatable by the driver of the vehicle.

17. A vehicular exterior rearview mirror assembly, the vehicular exterior rearview mirror assembly comprising:
a mounting arm configured for attachment at a side of a vehicle;
a mirror head having a mirror reflective element;
wherein the mirror head is mounted at the mounting arm via an adjustment mechanism;
wherein, with the mounting arm attached at the side of the vehicle, the mirror head is adjustable relative to the mounting arm between (i) a retracted position, where the mirror head is positioned at the side of the vehicle so that the mirror reflective element provides a rearward view to a driver of the vehicle that is at least rearward and along the side of the vehicle, and (ii) an extended position, where the mirror head is extended from the retracted position outward from the side of the vehicle to provide a different rearward view to the driver of the vehicle, and wherein the mirror head is closer to the side of the vehicle at which the mounting arm is attached when in the retracted position as compared to the extended position;
wherein the adjustment mechanism is operable to adjust the mirror head relative to the mounting arm between the retracted position and the extended position;
wherein the adjustment mechanism comprises an actuator disposed at the mirror head, and wherein the actuator is electrically operable to pivotally adjust a link, and wherein the link comprises (i) a first end pivotally attached at the mirror head, and (ii) a second end pivotally attached at the mounting arm;
wherein the adjustment mechanism, when the actuator electrically operates to pivotally adjust the link, moves the mirror head along a path between the retracted position and the extended position;
wherein the link comprises an inboard link and an outboard link, and wherein respective first ends of the inboard and outboard links pivotally attach at discrete positions at the mirror head, and wherein respective second ends of the inboard and outboard links pivotally attach at discrete positions at the mounting arm;
wherein the respective second ends of the inboard and outboard links pivotally attach at discrete positions of a mounting bracket of the mounting arm;
wherein the actuator is electrically operable to pivotally adjust the inboard link, and wherein the outboard link pivots according to pivotal adjustment of the inboard link; and
wherein, when the actuator electrically operates and the adjustment mechanism moves the mirror head between the retracted position and the extended position, the actuator travels along the path in tandem with the mirror head.

18. The vehicular exterior rearview mirror assembly of claim 17, wherein the inboard and outboard links each comprise an L-shaped link having (i) a first length extending from the respective first end and (ii) a second length extending from the respective second end and joined to the respective first end at an angle relative to the respective first length.

19. The vehicular exterior rearview mirror assembly of claim 18, wherein, when the mirror head is in the retracted position, the second length of the inboard link and the first length of the outboard link are perpendicular to the mounting arm, and wherein, when the mirror head is in the extended position, the first length of the inboard link and the second length of the outboard link are perpendicular to the mounting arm.

20. The vehicular exterior rearview mirror assembly of claim 17, wherein the mounting arm comprises an upper arm and a lower arm, and wherein the inboard and outboard links each comprise, respectively, (i) an upper portion that pivotally attaches at the mirror head and at the upper arm, and (ii) a lower portion that pivotally attaches at the mirror head and at the lower arm.

21. The vehicular exterior rearview mirror assembly of claim 20, wherein the inboard link comprises an inboard stanchion connecting the upper and lower portions of the inboard link, and wherein the inboard stanchion is pivotally attached at the mirror head and the upper portion and lower portion of the inboard link are non-pivotally connected to the inboard stanchion, and wherein the outboard link comprises an outboard stanchion connecting the upper and lower portions of the outboard link, and wherein the outboard stanchion is pivotally attached at the mirror head and the upper portion and the lower portion of the outboard link are non-pivotally connected to the outboard stanchion.

22. The vehicular exterior rearview mirror assembly of claim 21, wherein, when the actuator is electrically operated, the actuator rotates the inboard stanchion to pivotally adjust the upper and lower portions of the inboard link together and in tandem.

23. A vehicular exterior rearview mirror assembly, the vehicular exterior rearview mirror assembly comprising:
   a mounting arm configured for attachment at a side of a vehicle, wherein the mounting arm comprises an upper arm and a lower arm;
   a mirror head having a mirror reflective element;
   wherein the mirror head is mounted at the mounting arm via an adjustment mechanism;
   wherein, with the mounting arm attached at the side of the vehicle, the mirror head is adjustable relative to the mounting arm between (i) a retracted position, where the mirror head is positioned at the side of the vehicle so that the mirror reflective element provides a rearward view to a driver of the vehicle that is at least rearward and along the side of the vehicle, and (ii) an extended position, where the mirror head is extended from the retracted position outward from the side of the vehicle to provide a different rearward view to the driver of the vehicle, and wherein the mirror head is closer to the side of the vehicle at which the mounting arm is attached when in the retracted position as compared to the extended position;
   wherein the adjustment mechanism is operable to adjust the mirror head relative to the mounting arm between the retracted position and the extended position;
   wherein the adjustment mechanism comprises an actuator disposed at the mirror head, and wherein the actuator is electrically operable to pivotally adjust a driven link;
   wherein the adjustment mechanism, when the actuator electrically operates to pivotally adjust the driven link, moves the mirror head along a path between the retracted position and the extended position;
   wherein the adjustment mechanism comprises a guide link that pivots responsive to pivotal adjustment of the driven link;
   wherein the driven link and the guide link each comprise (i) a respective upper portion, and (ii) a respective lower portion;
   wherein the upper and lower portions of the driven link comprise (i) a respective first end and (ii) a respective second end pivotally attached at the mounting arm;
   wherein the adjustment mechanism comprises a stanchion connecting the first ends of the respective upper and lower portions of the driven link, and wherein the stanchion is pivotally attached at the mirror head, and wherein the first ends of the respective upper and lower portions of the driven link are non-pivotally attached at the stanchion;
   wherein the upper and lower portions of the guide link comprise (i) a respective first end and (ii) a respective second end pivotally attached at the mounting arm;
   wherein the adjustment mechanism comprises a pivot pin connecting the first ends of the respective upper and lower portions of the guide link, and wherein the first ends of the respective upper and lower portions of the guide link are pivotally attached at the mirror head via the pivot pin;
   wherein, when the actuator is electrically operated, the actuator rotates the stanchion to pivotally adjust the upper and lower portions of the driven link together and in tandem, and wherein the guide link pivots according to pivotal adjustment of the driven link; and
   wherein, when the actuator electrically operates and the adjustment mechanism moves the mirror head between the retracted position and the extended position, the actuator travels along the path in tandem with the mirror head.

24. The vehicular exterior rearview mirror assembly of claim 23, wherein the second ends of the respective upper portions of the driven link and the guide link pivotally attach at an upper mounting bracket of the upper arm and the second ends of the respective lower portions of the driven link and the guide link pivotally attach at a lower mounting bracket of the lower arm, and wherein the actuator is fixed to the mirror head.

25. The vehicular exterior rearview mirror assembly of claim 23, wherein the driven link and the guide link each comprise L-shaped upper and lower portions having (i) a first length extending from the respective first end and (ii) a second length extending from the respective second end and joined to the respective first length at an angle relative to the respective first length.

26. The vehicular exterior rearview mirror assembly of claim 25, wherein, when the mirror head is in the retracted position, the second length of the driven link and the first length of the guide link are perpendicular to the mounting arm, and wherein, when the mirror head is in the extended position, the first length of the driven link and the second length of the guide link are perpendicular to the mounting arm.

* * * * *